US008892510B2

(12) United States Patent
Kawaba

(10) Patent No.: US 8,892,510 B2
(45) Date of Patent: Nov. 18, 2014

(54) ANALYSIS-PROGRAM STORING RECORDING MEDIUM, ANALYZING APPARATUS, AND ANALYTIC METHOD

(75) Inventor: Motoyuki Kawaba, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 747 days.

(21) Appl. No.: 13/114,255

(22) Filed: May 24, 2011

(65) Prior Publication Data

US 2011/0302131 A1 Dec. 8, 2011

(51) Int. Cl.
*G06F 17/00* (2006.01)
*H04L 29/06* (2006.01)

(52) U.S. Cl.
CPC .................................. *H04L 63/1425* (2013.01)
USPC ............................ 707/610; 707/611; 709/248

(58) Field of Classification Search
CPC . G06F 2221/2101; G06F 21/10; G06F 21/33; G06F 11/3476; G06F 21/31; G06F 21/53; G06F 21/55; G06F 2221/2141
USPC ............ 707/600–831, 899, 999.001–999.206
See application file for complete search history.

(56) References Cited

U.S. PATENT DOCUMENTS 5,375,244 A * 12/1994 McNair ......................... 710/200
7,873,594 B2 1/2011 Harada et al.
2003/0226015 A1 * 12/2003 Neufeld et al. ................ 713/166
2005/0289231 A1 * 12/2005 Harada et al. ................. 709/224
2010/0115611 A1 * 5/2010 Morihara ......................... 726/19

FOREIGN PATENT DOCUMENTS

| JP | 2004-206564 | 7/2004 |
| JP | 2006-011683 | 1/2006 |
| JP | 2006-067279 | 3/2006 |
| JP | 2006-127409 | 5/2006 |

OTHER PUBLICATIONS http://www.networld.co.jp/chakra/chakra.htm, published at least as of Mar. 16, 2010; pp. 1-3 (with English translation).

* cited by examiner

*Primary Examiner* — Angelica Ruiz
(74) *Attorney, Agent, or Firm* — Fujitsu Patent Center

(57) ABSTRACT

An analyzing apparatus extracts a plurality of sequence candidates for communications related to unauthorized access performed between a plurality of information processing apparatuses on a basis of communication histories stored in a storage unit storing the communication histories between the plurality of information processing apparatuses. The apparatus calculates and outputs an evaluation value representing a degree of probability that the respective plurality of sequence candidates are unauthorized accesses on a basis of normality of a transaction which is restorable by a second communication history excluding a first communication history corresponding to each of the plurality of sequence candidates, among the communication histories stored in the storage unit.

11 Claims, 29 Drawing Sheets

FIG. 7

```
     121
      │
        121a   121b      121c                      121d      121e                         121f
         ┌──┐ ┌────┐ ┌──────────────────┐ ┌──────────────────┐ ┌──────────┐          ┌────────┐
1  ...  2010/03/01 00:00:00.100 194.185.39.24:51272 -> 194.23.6.226:10443 Request HTTP,
         POST /cgi-bin/AXXPF3943?_type=0016&_zid=LrgkVcFasr8A&__sid=LrgkVcFasr8A&__uid=1192
2       2010/03/01 00:00:00.200 194.23.6.226:39931 -> 194.23.7.168:8002 Request IIOP,AXXG13130/INF/H01
3       2010/03/01 00:00:00.300 194.185.39.25:51272 -> 194.23.6.226:10443 Request HTTP,
         POST /cgi-bin/AXXPF3943?_type=0016&_zid=XXX&__sid=YYY&__uid=ZZZ
4       2010/03/01 00:00:00.350 194.23.6.226:39931 -> 194.23.7.168:8002 Request IIOP,XXX/INF/H00
5       2010/03/01 00:00:00.400 194.23.7.168:52245 -> 194.23.8.198:1521 Request DB,
         select name into :b0 from member where (b_id=TO_NUMBER(:b1) and a_number=TO_NUMBER(:b2))
6       2010/03/01 00:00:00.500 194.23.7.168:52245 <- 194.23.8.198:1521 Response DB,16
7  ...
   ...  2010/03/01 00:00:00.800 194.23.6.226:39931 <- 194.23.7.168:8002 Response IIOP,0
8  ...  2010/03/01 00:00:01.050 194.185.39.24:51272 <- 194.23.6.226:10443 Response HTTP,200
   ...
```

FIG. 8

| | | | | 122 |
|---|---|---|---|---|
| PROTOCOL-LOG MANAGEMENT TABLE ||||| 
| ITEM NO. | TIME | ID NO. | PROTOCOL | REQUEST/RESPONSE |
| ... | ... | ... | ... | ... |
| 1001 | 00:00:00.100 | 101 | HTTP | REQUEST |
| 1002 | 00:00:00.200 | 201 | IIOP | REQUEST |
| 1003 | 00:00:00.300 | 102 | HTTP | REQUEST |
| 1004 | 00:00:00.350 | 202 | IIOP | REQUEST |
| 1005 | 00:00:00.400 | 301 | DB | REQUEST |
| 1006 | 00:00:00.500 | 301 | DB | RESPONSE |
| 1007 | 00:00:00.550 | 103 | HTTP | REQUEST |
| 1008 | 00:00:00.600 | 302 | DB | REQUEST |
| 1009 | 00:00:00.650 | 203 | IIPO | REQUEST |
| 1010 | 00:00:00.800 | 201 | IIPO | RESPONSE |
| 1011 | 00:00:00.850 | 302 | DB | RESPONSE |
| 1012 | 00:00:00.950 | 202 | IIOP | RESPONSE |
| 1013 | 00:00:01.000 | 303 | DB | REQUEST |
| 1014 | 00:00:01.050 | 101 | HTTP | RESPONSE |
| 1015 | 00:00:01.150 | 303 | DB | RESPONSE |
| 1016 | 00:00:01.200 | 102 | HTTP | RESPONSE |
| 1017 | 00:00:01.300 | 203 | IIOP | RESPONSE |
| 1018 | 00:00:01.400 | 103 | HTTP | RESPONSE |
| ... | ... | ... | ... | ... |

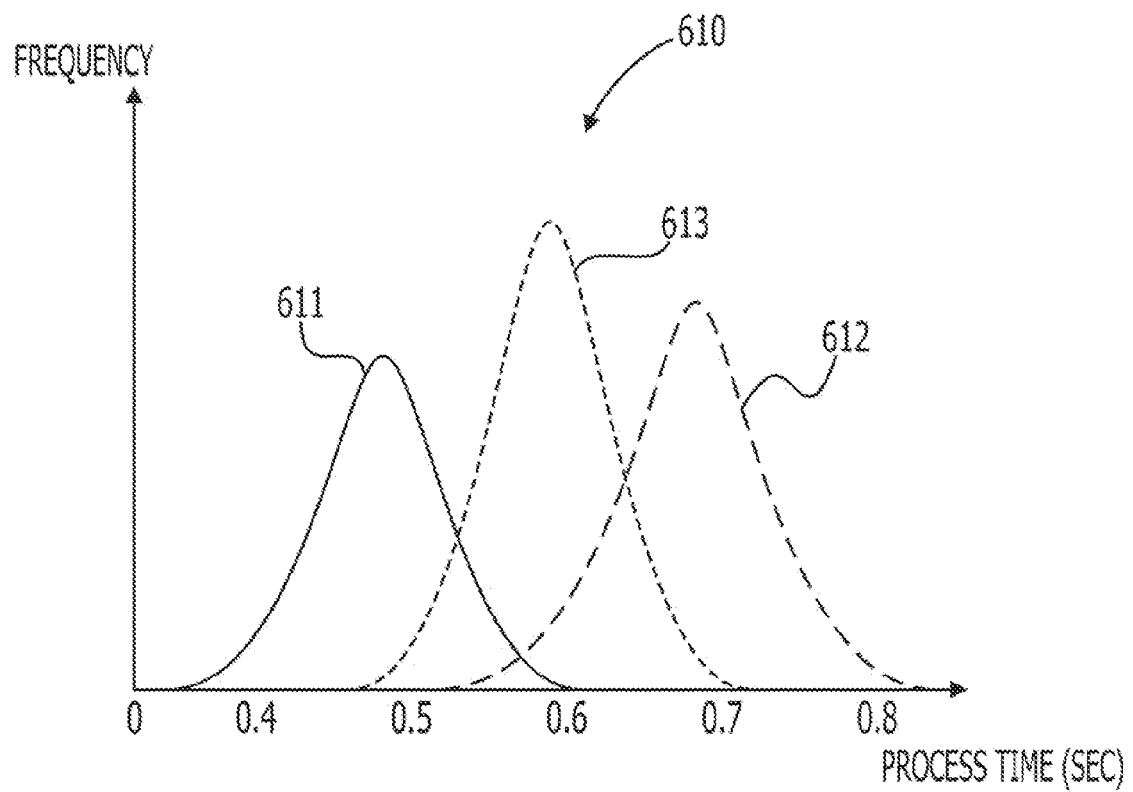

ANALYSIS-PROGRAM STORING RECORDING MEDIUM, ANALYZING APPARATUS, AND ANALYTIC METHOD

CROSS-REFERENCE TO RELATED APPLICATIONS

This application is based upon and claims the benefit of priority of the prior Japanese Patent Application No. 2010-126787, filed on Jun. 2, 2010, the entire contents of which are incorporated herein by reference.

FIELD

The embodiments disclosed herein are related to analysis-program storing recording medium, analyzing apparatus, and analytic method.

BACKGROUND

Conventionally, information processing systems where processes are hierarchically shared by a plurality of computers have been used (such systems are also referred to as hierarchical systems). As a hierarchical network, a three-layer hierarchical system has been known in the art. The three-layer hierarchical system includes a Web server for providing an interface for system utilization, an Application (AP) server for executing a process on the system, and a Database (DB) server for managing data. These servers cooperate with one another to execute a process in response to a process request from the user and then fulfill the process request. In this way, the reliability and response of the system will be improved by causing the respective computers to share the process.

Many information process systems handle confidential information, such as personal information and trade secret information. Therefore, proper protective measures, such as prevention against fraudulent acquisition of confidential information and prevention against alteration, have been desired. Thus, a network connected to servers to be protected may be provided with an Intrusion Detection System (IDS). The IDS compares communication data acquired from the network with previously registered patterns of unauthorized (or normal) information to detect unauthorized access to the relevant server or network.

On the other hand, when a registered user or an impersonator properly accesses the system, the IDS cannot detect the access as an unauthorized one. This is because the impersonator holds a proper ID or password and is capable of accessing the system without following any unauthorized procedure. However, the registered user or the like may manipulate data improperly. Thus, there is a technology for detecting unauthorized access by monitoring the manipulation of a database.

Here, in the hierarchical system, a process is shared by servers installed on the respective hierarchical layers. Thus, when unauthorized access to a database is detected, a series of communications (communication sequences) may be identified by tracking the communications related to the unauthorized access to identify the access source (for example, the accessing user or a terminal device). By identifying the communication sequence, for example, the access source can be identified, for example, from the history of access to the Web server. As a result, it becomes possible to appropriately manage the access source.

However, various application programs designed uniquely may be introduced into the hierarchical system to realize the functions of the respective layers. In this case, each application program manages communication data in a unique way. Thus, even if unauthorized access to a database is detected, it is difficult to trace the communication data in the massive amounts of communication data to identify the communication sequence of the unauthorized access.

SUMMARY

According to an aspect of the invention, an analyzing apparatus extracts a plurality of sequence candidates for communications related to unauthorized access performed between a plurality of information processing apparatuses on a basis of communication histories stored in a storage unit storing the communication histories between the plurality of information processing apparatuses. The apparatus calculates and outputs an evaluation value representing a degree of probability that the respective plurality of sequence candidates are unauthorized accesses on a basis of normality of a transaction which is restorable by a second communication history excluding a first communication history corresponding to each of the plurality of sequence candidates, among the communication histories stored in the storage unit.

The object and advantages of the invention will be realized and attained by at least the features, elements, and combinations particularly pointed out in the claims. It is to be understood that both the foregoing general description and the following detailed description are exemplary and explanatory and are not restrictive of the invention, as claimed.

BRIEF DESCRIPTION OF THE DRAWINGS

FIG. 7 is a diagram illustrating a specific example of a restoration message;

FIG. 8 is an exemplary data structure of a protocol-log management table;

FIGS. 22A and 22B are diagrams each illustrating a specific example of the validity evaluation;

DESCRIPTION OF EMBODIMENTS

Hereafter, embodiments will be described in detail with reference to the attached drawings.

First Embodiment

Figure 1:
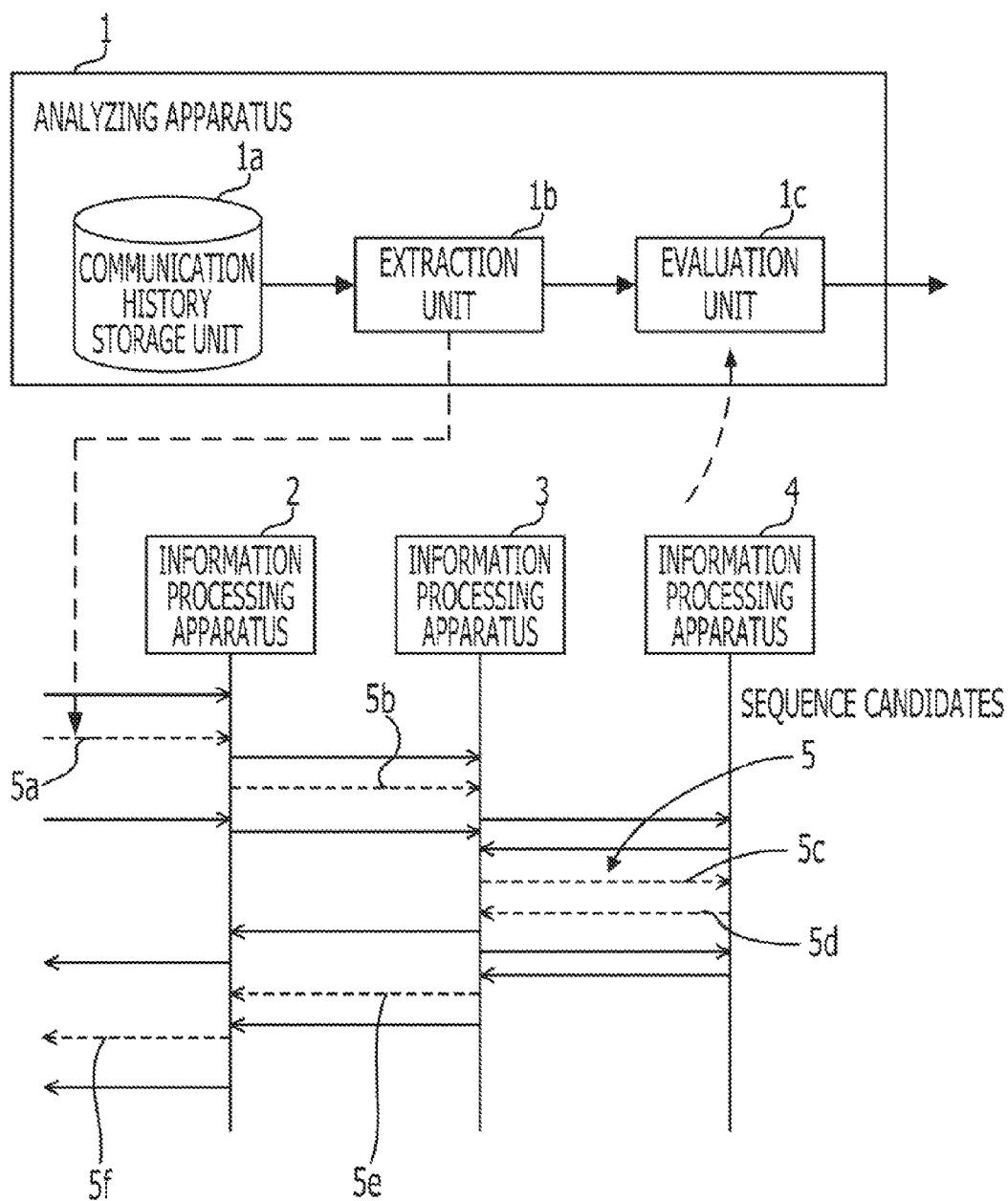
FIG. 1 is a diagram illustrating an analyzing apparatus according to a first embodiment.

FIG. 1 is a diagram illustrating an analyzing apparatus according to a first embodiment. An analyzing apparatus 1 is connected to a plurality of information processing apparatuses through a network. The analyzing apparatus 1 acquires and analyzes data transmitted among a plurality of information processing apparatuses. The analyzing apparatus 1 includes a communication history storage unit 1a, an extraction unit 1b, and an evaluation unit 1c.

The communication history storage unit 1a stores a communication history which is the history of communication data transmitted and received among information processing apparatuses 2, 3, and 4. Here, the information processing apparatuses 2, 3, and 4 form a hierarchical system and execute a process in collaboration with one another. The communication history is a history of the acquisition of data transmitted and received by the information processing apparatuses 2, 3, and 4 through the network.

Based on the communication histories stored in the communication history storage unit 1a, the extraction unit 1b extracts a plurality of sequence candidates for communication procedures for unauthorized access performed among the information processing apparatuses 2, 3, and 4.

The extraction unit 1b extracts, for example, a plurality of sequence candidates including sequence candidates 5. The sequence candidates 5 include communications 5a, 5b, 5c, 5d, 5e, and 5f.

The communication 5a is a request from a specified terminal device to the information processing apparatus 2. The communication 5b is a request from the information processing apparatus 2 to the information processing apparatus 3. The communication 5c is a request from the information processing apparatus 3 to the information processing apparatus 4. The communication 5d is a response from the information processing apparatus 4 to the information processing apparatus 3. The communication 5e is a response from the information processing apparatus 3 to the information processing apparatus 2. The communication 5f is a response from the information processing apparatus 2 to a specified information processing apparatus.

Here, the communication history includes information for identifying the communications 5a, 5b, 5c, 5d, 5e, and 5f. The evaluation unit 1c calculates and outputs evaluation values that represent the degrees of probability of the respective sequence candidates among the communication histories stored in the communication history storage unit 1a based on a second communication history excluding a first communication history corresponding to the respective sequence candidates extracted by the extraction unit 1b.

For example, the evaluation unit 1c acquires a second communication history from the communication histories stored in the communication history storage unit 1a with the exception of a first communication history that corresponds to the sequence candidates 5. In this case, the first communication history represents the communications 5a, 5b, 5c, 5d, 5e, and 5f. In other words, the second communication history does not include the communications 5a, 5b, 5c, 5d, 5e, and 5f. The evaluation unit 1c calculates an evaluation value representing the degree of probability that the sequence candidates 5 are unauthorized accesses based on the normality of a transaction which may be restored from the second communication history.

The term "normality of transaction" used herein means the degree of possibility that the restored transaction is one executed by the usual proper communication. The higher the normality of the transaction restored by removing the sequence candidates 5 is, the higher the degree of probability that the sequence candidates 5 are unauthorized accesses. On the other hand, the lower the normality of the transaction restored by removing the sequence candidates 5 is, the lower the degree of probability that the sequence candidates 5 are unauthorized accesses.

As a method for restoring a transaction from a communication history, for example, one described in Japanese Unexamined Patent Application Publication No. 2006-011683 is applicable.

Therefore, the evaluation unit 1c calculates and outputs an evaluation value representing the degree of probability for each sequence candidate.

The analyzing apparatus 1 executes the following process. First, based on the communication histories stored in the communication history storage unit 1a, the extraction unit 1b extracts a plurality of sequence candidates for communication procedures of unauthorized accesses performed among the information processing apparatuses 2, 3, and 4. The evaluation unit 1c calculates and outputs an evaluation value representing the degree of probability that each sequence candidate is an unauthorized access based on the normality of transaction which may be restored from the second communication history among the communication histories stored in the communication history storage unit 1a with the exception of the first communication history that corresponds to each sequence candidate extracted by the extraction unit 1b.

Therefore, the analyzing apparatus 1 is able to support the identification of a sequence for unauthorized accesses in a hierarchical system, efficiently. Specifically, the support is performed as follows.

The analyzing apparatus 1 extracts and evaluates sequence candidates using communication histories stored in the communication history storage unit 1a. In other words, the process may be performed without depending on application programs which individually run in the information processing apparatuses 2, 3, and 4. Therefore, each application is available without any modification, so that it can be easily installed.

For a plurality of sequence candidates, the analyzing apparatus 1 calculates an evaluation value for each sequence candidate based on the normality of transaction which may be restored from the second communication history with the exception of the first communication history that corresponds to each sequence candidate.

Typically, an unusual process is performed as a communication process related to unauthorized access. For example, in order to perform unauthorized access to data, a process which is different from a routine business process is performed. Therefore, the pattern of a communication sequence which is considered to be related to unauthorized access may be different from the normal process. Thus, when the second communication history includes an abnormal communication sequence related to unauthorized access, a decrease in normality of transaction restored by the second communication history occurs. On the other hand, when the second communication history does not include any abnormal communication sequence related to unauthorized access, an increase in normality of transaction restored by the second communication history occurs.

For these reasons, based on the normality of transaction restored by the second communication history, the analyzing apparatus 1 is able to evaluate the degree of probability that each sequence candidate related to unauthorized access is an actual unauthorized access.

The analyzing apparatus 1 outputs the evaluation value obtained as described above. A system manager is able to easily identify a communication candidate having a higher degree of probability among communication sequence candidates related to unauthorized access. Therefore, in the hierarchical system, the identification of a sequence related to unauthorized access will be efficiently supported.

In the following embodiment, an example in which the analyzing apparatus 1 is applied to a Web three-layer hierarchical system will be described more specifically.

Second Embodiment

Figure 2:
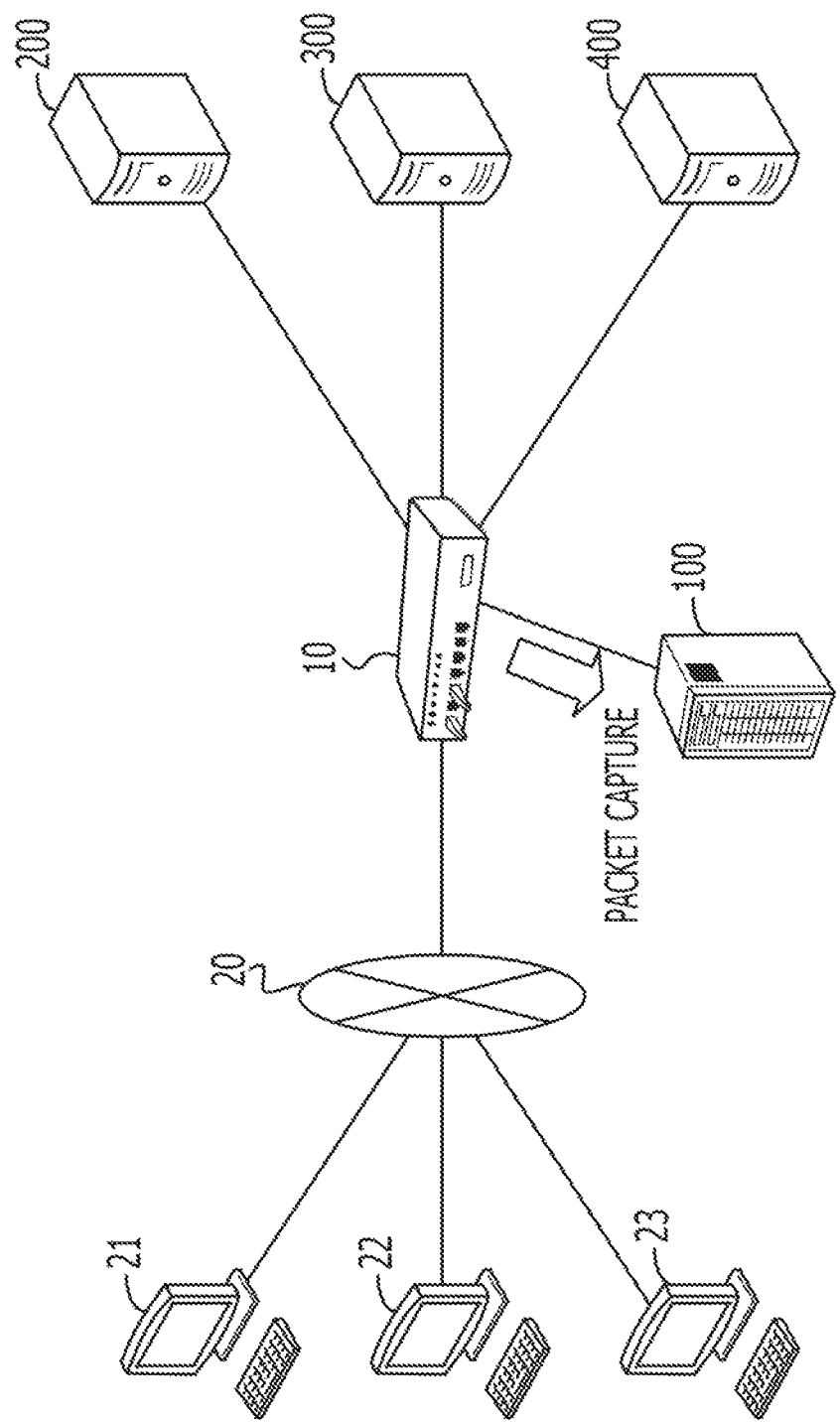
FIG. 2 is a diagram illustrating a business system according to a second embodiment.

FIG. 2 is a diagram illustrating a business system according to a second embodiment. This business system includes an unauthorized-access detecting apparatus 100, a Web server 200, an AP server 300, and a DB server 400. The unauthorized-access detecting apparatus 100, the Web server 200, the AP server 300, and the DB server 400 are mutually connected via a switch device 10. The switch device 10 is connected to terminal devices 21, 22, and 23 through a network 20.

The terminal devices 21, 22, and 23 are accessible to the Web server 200 via the switch device 10 and the network 20. The users of the terminal devices 21, 22, and 23 may utilize the business system by operating a Graphical User Interface (GUI) provided by the Web server 200 through the terminal devices 21, 22, and 23, respectively. The network 20 may be, for example, an intranet.

Alternatively, the network 20 may be the Internet. In this case, the switch device 10 may also function as a firewall. In addition, a network segment to which the Web server 200 belongs is treated as, for example, a Demilitarized Zone (DMZ).

The unauthorized-access detecting apparatus 100 manages the execution statuses of the Web server 200, AP server 300, and DB server 400, respectively. The unauthorized-access detecting apparatus 100 is able to acquire the information for the management of the execution statuses from the switch device 10. In other words, the switch device 10 has a port mirroring function and also transmits packets, which are transmitted and received among the Web server 200, the AP server 300, and the DB server 400, to the unauthorized-access detecting apparatus 100. The unauthorized-access detecting apparatus 100 receives and stores a packet transmitted from the switch device 10 (packet capture). Here, if the unauthorized-access detecting apparatus 100 is simply intended to perform packet capture, a repeater hub may be used as a substitute for the switch device 10.

The exemplary business system has been described as including one of each of the Web server 200, AP server 300, and DB server 400 on the respective layers (Web layer, App layer, and DB layer). Alternatively, two or more servers may be provided on each layer.

Figure 3:
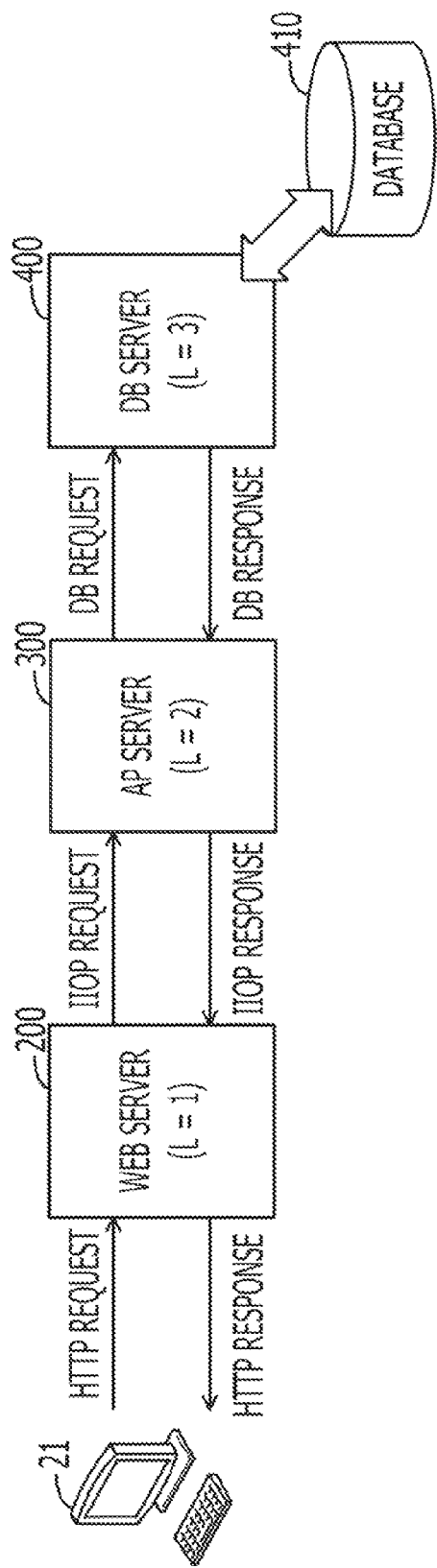
FIG. 3 is a diagram illustrating communication among servers.

FIG. 3 is a diagram illustrating the communication among servers. The Web server 200 accepts a process request (message) to conduct processing with the business system from a Web browser executed on each of the terminal apparatuses 21, 22, and 23. Here, a message exchange between the Web server 200 and each of the terminal apparatuses 21, 22, and 23 is performed using the Hyper Text Transfer Protocol (HTTP). Alternatively, another protocol may be used.

In the following description, the process request transmitted from each of the terminal apparatuses 21, 22, and 23 to the Web server 200 will be referred to as a HTTP request. In addition, a response to the HTTP request is referred to as a HTTP response. Both the request and the response are exemplary contents of the communication.

The Web server 200 generates a HTTP response with respect to static contents from its own device in response to a HTTP request received from each of the terminal apparatuses 21, 22, and 23, and then transmits the HTTP response to each of the terminal apparatuses 21, 22, and 23. Furthermore, for dynamic contents, a process request (message) indicating the processing to be requested to the AP server 300 is generated and transmitted to the AP server 300.

Here, a message exchange between the Web server 200 and the AP server 300 is performed using an Internet Inter-Object Request Broker (ORB) Protocol (IIOP). Alternatively, another protocol may be used.

In the following description, a process request transmitted from the Web server 200 to the AP server 300 will be referred to as an IIOP request. In addition, a response to the IIOP request is referred to as an IIOP response.

On receiving the IIOP response to the IIOP request, the Web server 200 generates a HTTP response based on the contents of the IIOP response and transmits the HTTP response to each of the terminal devices 21, 22, and 23.

The AP server 300 generates a query for processing to be requested to the DB server 400 in response to an IIOP request received from the Web server 200 and then transmits the query to the DB server 400.

Here, the query generated from the AP server 300 is written in, for example, a Structured Query Language (SQL) sentence. In the following description, the query transmitted from the AP server 300 to the DB server 400 is referred to as a DB request. In addition, a response to the DB request is referred to as a DB response.

Upon receiving the DB response to the DB request, the AP server 300 generates an IIOP response based on the contents of the DB request and transmits the IIOP response to the Web server 200.

The DB server 400 performs the SQL sentence in the DB request received from the AP server 300 to execute, for example, a process for referencing or updating a database 410. The DB server 400 generates a DB response based on the result of the process and transmits the DB response to the AP server 300.

Here, the Web server 200 is placed on a hierarchical layer higher than the hierarchical layers of the AP server 300 and DB server 400. In addition, the AP server 300 is placed on a hierarchical layer higher than that of the DB server 400. Specifically, layer number L=1 is defined as the hierarchical layer of the Web server 200. Layer number L=2 is defined as the hierarchical layer of the AP server 300. Layer number L=3 is defined as the hierarchical layer of the DB server 400. The smaller the layer number L is, the higher the placement of the hierarchical layer. The information that defines the hierarchical relationship among these servers is previously stored in the unauthorized-access detecting apparatus 100.

In the following description, the phrase "each server" or "respective servers" means the Web server 200, the AP server 300, and the DB server 400.

Figure 4:
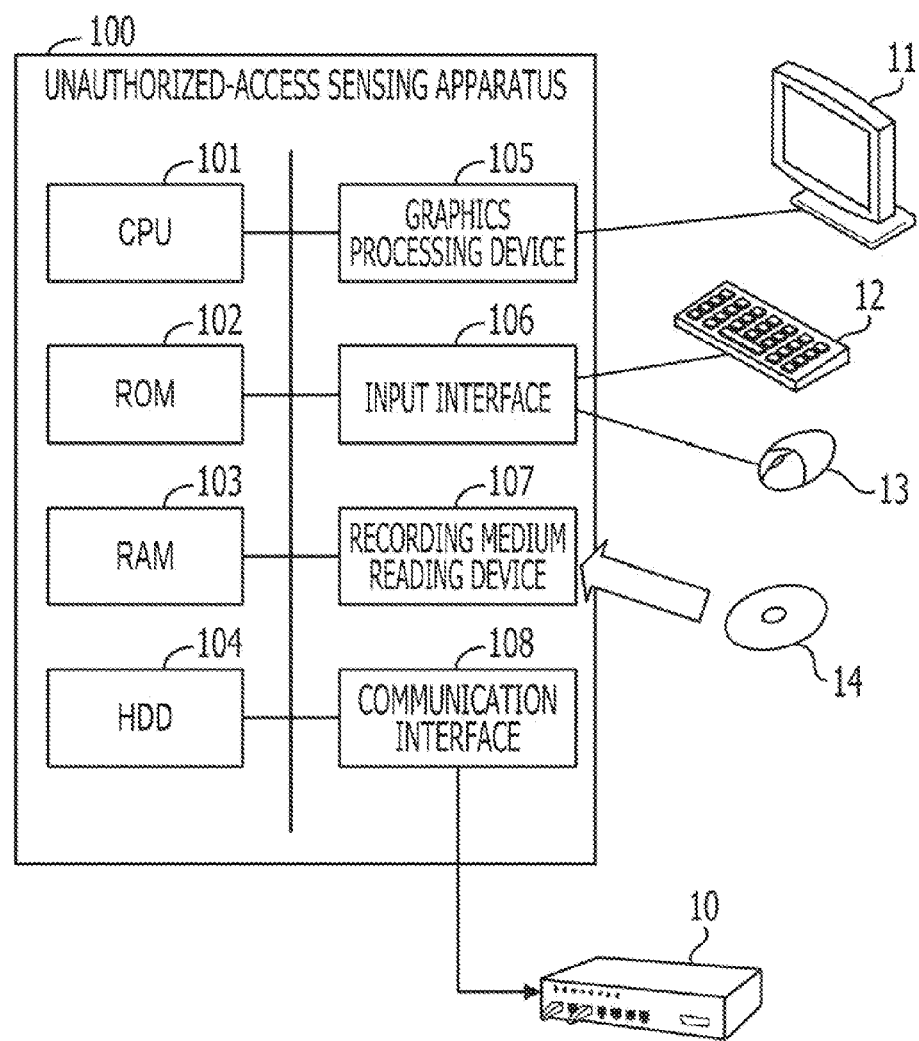
FIG. 4 is a diagram illustrating a hardware configuration of an unauthorized-access sensing apparatus.

FIG. 4 is a diagram illustrating a hardware configuration of the unauthorized-access sensing apparatus. The unauthorized-access detecting apparatus 100 includes a Central processing Unit (CPU) 101, a Read Only Memory (ROM) 102, a Random Access Memory (RAM) 103, a Hard Disk Drive (HDD) 104, a graphics processing unit 105, an input interface 106, a recording medium reading device 107, and a communication interface 108.

The CPU 101 controls the entire unauthorized-access detecting apparatus 100.

The ROM 102 stores the program of Basic Input/Output System (BIOS) and so on of the unauthorized-access detecting apparatus.

The RAM 103 temporarily stores some of the programs of the Operating System (OS) and the programs of applications to be executed by the CPU 101. In addition, the RAM 103 stores various data required for processing by the CPU 101.

The HDD 104 stores the OS program and the application program. In addition, the HDD 104 stores various data required for processing by the CPU 101. Other storage devices, such as a Solid State Drive (SSD), may be used instead of the HDD 104 or in combination with the HDD 104.

The graphics processing unit 105 is connected to a monitor 11. The graphics processing unit 105 displays an image on the screen of the monitor 11 according to a command from the CPU 101.

The input interface 106 is connected to a keyboard 12 and a mouse 13. The input interface 106 sends signals from the keyboard 12 and mouse 13 to the CPU 101.

The recording medium reading device 107 is a reader that reads data stored in a recording medium 14. For example, functions to be performed by the unauthorized-access detecting apparatus 100 may be implemented by causing a computer to execute programs in which the process contents of these functions are described. These programs may be stored in the computer-readable recording medium 14 and distributed therefrom. Alternatively, the programs may be stored in a program distribution server (not illustrated) connected to the switch device 10 or the network 20. In this case, the unauthorized-access detecting apparatus 100 is able to download a program from the program distribution server via the switch device 10 or the network 20.

As a recording medium 14, for example, a magnetic recording medium, an optical disc, a magneto-optical recording medium, or a semiconductor memory may be used. Examples of the magnetic recording medium include a HDD, a Flexible Disk (FD), and a magnetic tape. Examples of the optical disc include a Compact Disc (CD), a CD-Recordable (R)/ReWritable (RW), a Digital Versatile Disc (DVD), and a DVD-R/RW/RAM. Examples of the magneto-optical recording medium include a Magneto-Optical disk (MO). Examples of the semiconductor memory include a flash memory such as a Universal Serial Bus (USB) memory.

The communication interface 108 is connected to the switch device 10 via a Twisted Pair (TP) cable, an optical cable, or the like. The communication interface 108 performs data communication with another information processing apparatus via the switch device 10. In addition, the communication interface 108 receives packets transmitted and received among the respective servers via the switch device 10.

Here, each server as well as each of the terminal devices 21, 22, and 23 may be implemented using a hardware configuration similar to that of the unauthorized-access detecting apparatus 100.

Figure 5:
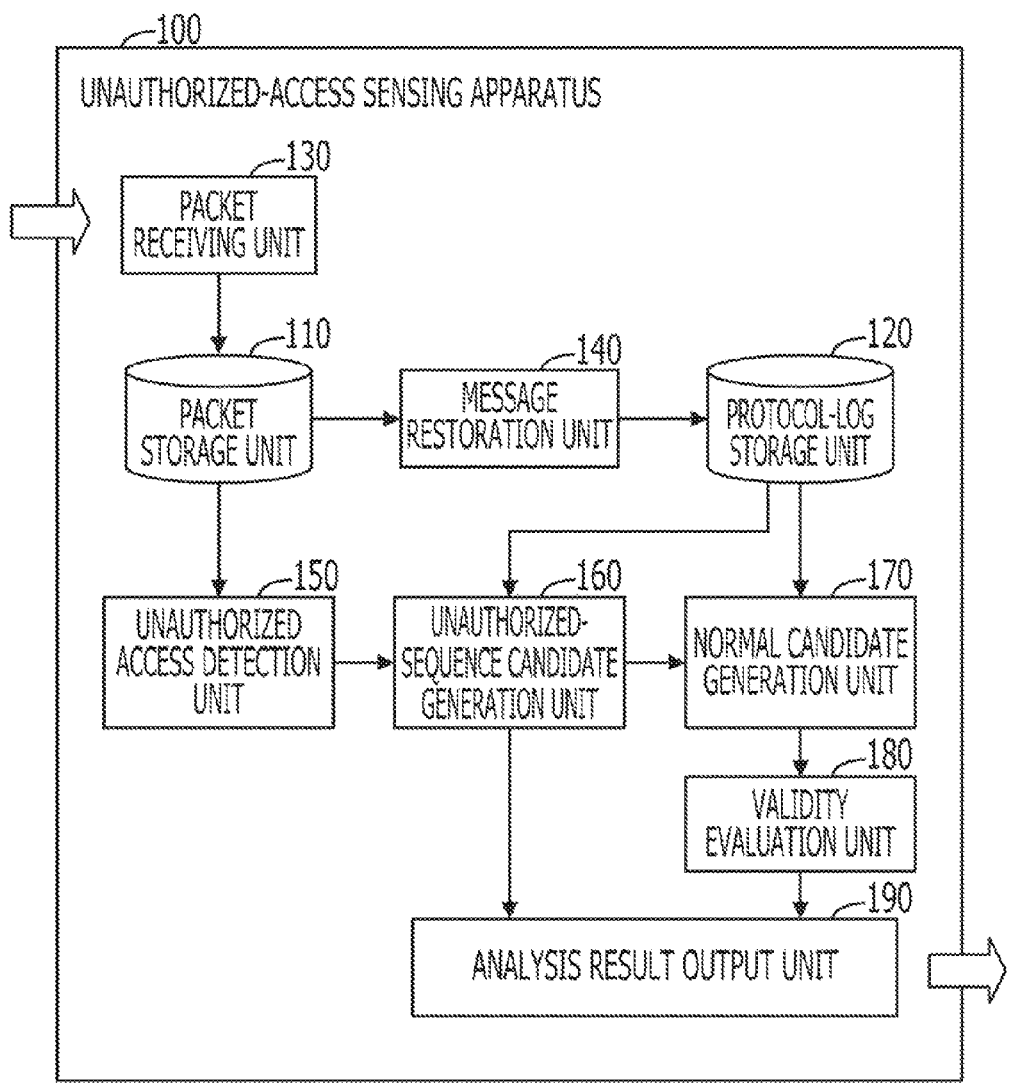
FIG. 5 is a diagram illustrating a functional configuration of the unauthorized-access detecting apparatus.

FIG. 5 is a diagram illustrating a functional configuration of the unauthorized-access detecting apparatus. The unauthorized-access detecting apparatus 100 includes a packet storage unit 110, a protocol-log storage unit 120, a packet receiving unit 130, a message restoration unit 140, an unauthorized access detection unit 150, an unauthorized-sequence candidate generation unit 160, a normal candidate generation unit 170, a validity evaluation unit 180, and an analysis-result output unit 190. These functions are implemented by causing the CPU 101 to execute specified programs, respectively. Alternatively, at least a part or all of these functions may be implemented by dedicated hardware.

The packet storage unit 110 stores packet information captured by the packet receiving unit 130. The protocol-log storage unit 120 stores protocol log information generated by the message restoration unit 140. Here, the protocol log information is generated based on the packet information and represents the communication history of each server in the business system.

The packet receiving unit 130 receives a packet, which is transmitted and received via the switch device 10, from the switch device 10. The packet receiving unit 130 stores the received packet as packet information in the packet storage unit 110. The packet receiving unit 130 continuously acquires packets, for example, during the work of the business system.

The message restoration unit 140 restores a message contained in the packet information based on the packet information stored in the packet storage unit 110. Then, the message restoration unit 140 generates a protocol log from the restored message and stores the protocol log in the protocol-log storage unit 120.

The function of the message restoration unit 140 may be implemented, for example, by applying the function described in Japanese Unexamined Patent Application Publication No. 2006-011683.

The unauthorized access detection unit 150 detects an unauthorized access to the DB server 400 based on the packet information stored in the packet storage unit 110. The function of the unauthorized access detection unit 150 may be implemented, for example, by applying the function of a "database surveillance tool".

When the unauthorized access is detected by the unauthorized access detection unit 150, the unauthorized-sequence candidate generation unit 160 generates a plurality of unauthorized sequence candidates related to the unauthorized access based on the protocol log stored in the protocol-log storage unit 120. The unauthorized-sequence candidate generation unit 160 outputs each generated unauthorized sequence candidate to the normal candidate generation unit 170 and the analysis-result output unit 190.

The normal candidate generation unit 170 generates candidates of normal messages (hereinafter, referred to as normal candidates) among messages with the exception of those related to the respective unauthorized sequence candidates based on each unauthorized sequence candidate acquired from the unauthorized-sequence candidate generation unit 160 and the protocol log stored in the protocol-log storage unit 120. The normal candidate generation unit 170 outputs each generated normal candidate to the validity evaluation section 180.

The validity evaluation section 180 evaluates the normality of each normal candidate acquired from the normal candidate generation unit 170 and calculates an evaluation value as an index of the normality. The validity evaluation section 180 outputs the calculated evaluation value to the analysis-result output unit 190.

The analysis-result output unit 190 ranks and outputs the unauthorized sequence candidate acquired from the unauthorized-sequence candidate generation unit 160 according to the evaluation value acquired from the validity evaluation section 180. For example, the analysis-result output unit 190 causes the monitor 11 to display the result of the ranking in a list view.

The unauthorized-sequence candidate generation unit 160 may generate only one unauthorized sequence candidate. In this case, in conclusion, the unauthorized sequence candidate may definitely be related to the unauthorized sequence even if the evaluation is not conducted on the unauthorized sequence candidate. In this case, therefore, the analysis-result output unit 190 may output the unauthorized sequence candidate as is.

Figure 6:
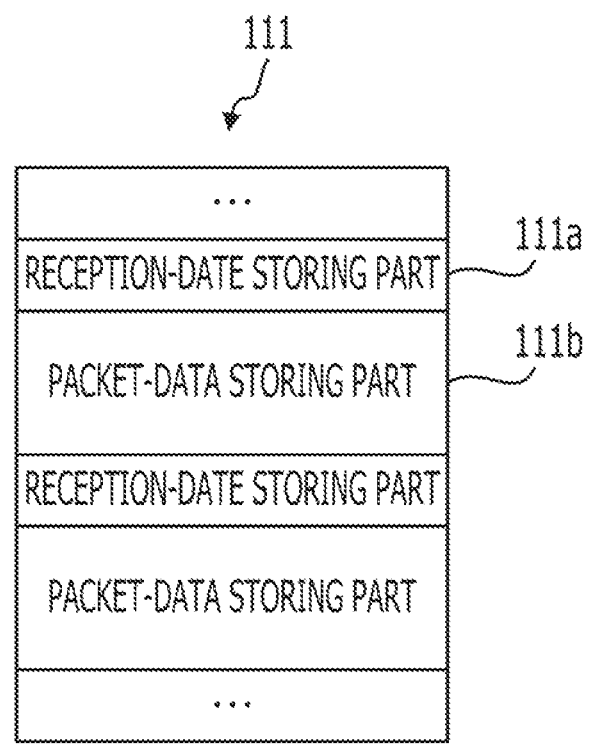
FIG. 6 is a diagram illustrating an exemplary data structure of packet information.

FIG. 6 is a diagram illustrating an exemplary data structure of the packet information. A packet storage file 111 is a file in which packets collected by the packet receiving unit 130 are stored. Information about a newly received packet is added to the packet storage file 111 every time the packet receiving unit 130 receives a packet. The packet storage file 111 may be, for example, a binary format file.

The packet storage file 111 includes a reception-date storing part 111a and a packet-data storing part 111b.

The reception-date storing part 111a is an area that sets up the time and date of receiving a packet to be stored in the packet-data storing part 111b. The packet receiving unit 130 stores a time stamp (for example, hour, minute, second, month, day, year) at the time of receiving the packet.

The packet-data storing part 111b is an area where the packet received by the packet receiving unit 130 is stored.

The message restoration unit 140 is able to restore a message transmitted and received by each server based on the packet storage file 111 stored in the packet storage unit 110. As described above, for example, the method for restoring the message may be the method described in Japanese Unexamined Patent Application Publication No. 2006-011683.

FIG. 7 is a diagram illustrating a specific example of the restoration message. The restoration message 121 is generated based on the packet storage file 111, which is stored in the packet storage unit 110 by the message restoration unit 140, and stored in the protocol-log storage unit 120. The restoration message 121 is data for generating a protocol-log management table described later. In FIG. 7, only a part of the restoration message 121 applicable to the following explanation will be described. The remaining parts of the message are omitted from the drawing.

Each line of the restoration message 121 includes a date field 121a, a time field 121b, a source address field 121c, a destination address field 121d, a command type field 121e, and a command field 121f.

The date field 121a is a field that represents the date when a packet corresponding to the message is captured.

The time field 121b is a field that represents the time when the packet corresponding to the message is captured.

The source address field 121c is a field that represents the Internet Protocol (IP) address and port number of a message source computer.

The destination address field 121d is a field that represents the IP address and port number of a message destination computer.

The command type field 121e is a field that represents the request/response attributes and protocol type (such as HTTP, IIOP, or DB query) of a command.

The command field 121f is a field that represents the contents of the command, such as a request, represented in the command type field 121e.

Hereinafter for the sake of convenience, the line number assigned to the restoration message 121 will be described.

For example, the message of line number 1 represents a HTTP request.

In the date field 121a, for example, "2010/03/01" is acquired as the date when a packet corresponding to the line is captured. The message restoration unit 140 is able to acquire the date set as such a date in the reception-date storing part 111a of the packet storage file 111.

In addition, a packet-captured time is acquired as, for example "00:00:00.100", in the time field 121b. The message restoration unit 140 is able to acquire the time set as the time in the reception-date storing part 111a of the packet storage file 111. Here, a millisecond (msec) is illustrated as the unit of time. Alternatively, the time may be acquired with a still smaller unit (for example, microsecond).

In the source address field 121c, for example, "194.185.39.24:51272" is acquired as the IP address and port number of the terminal device 21 which has transmitted a HTTP request.

In the destination address field 121d, for example, "194.23.6.226:10443" is acquired as the IP address and port number of the Web server which is the destination of the HTTP request.

In the command type field 121e, for example, "Request HTTP" information is acquired as information which represents the first line as a message about the HTTP request. The message restoration unit 140 is able to distinguish, for example, a message from the terminal device 21 of the external network to the Web server 200 from the HTTP request. The message restoration unit 140 is able to distinguish, for example, a message transmitted from the Web server 200 to a lower hierarchical AP server 300 from the IIOP request. The message restoration unit 140 is able to distinguish the DB request and various responses in a similar fashion.

The command field 121f acquires, for example, the information "POST/cgi-bin/ . . . " as contents of the HTTP request.

Thus, it is possible to detect what kind of message was transmitted to which server by referring to the restoration message 121.

Here, other IP addresses in the restoration message 121 correspond to the respective devices as follows:

"194.23.7.168" represents the IP address of AP server 300.
"194.23.8.198" represents the IP address of DB server.
"194.185.39.25" represents the IP address of terminal device 22.

In other words, the transmission and reception of HTTP request/HTTP response between the Web server 200 and the terminal device 22 will be identified by the source address field 121c, destination address field 121d, command type, and so on in each line. For example, the third line of the restoration message 121 corresponds to the HTTP request.

In addition, the transmission and reception of the IIOP request and the IIPO response between the Web server 200 and the AP server 300 correspond to the second and the seventh lines of the restoration message 121.

Furthermore, the transmission and reception of the DB request and the DB response between the AP server 300 and the DB server 400 correspond to the fifth and sixth lines of the restoration message 121.

The message restoration unit 140 is able to bring a request into correspondence with a response to the request. For example, the first line represents a HTTP request from the terminal device 21 to the Web server 200. On the other hand, a HTTP response from the Web server 200 to the terminal device 21, which is generated after that, is represented on the eighth line. Therefore, the message restoration unit 140 is able to identify that the response was made by the HTTP response on the eighth line to the HTTP request on the first line. The message restoration unit 140 attaches information for distinguishing the combination of the request and the response, which are brought into correspondence with each other as described above, and generates protocol-log management information.

FIG. 8 is an exemplary data structure of a protocol-log management table. The protocol-log management table 122 is generated by the message restoration unit 140 and is stored in the protocol-log storage unit 120.

The protocol-log management table 122 is provided with items representing item number (Item No.), time (Time), identification number (ID No.), protocol (Protocol), and request or response (Request/Response). Pieces of information arranged in the transverse direction are correlated with one another to represent information about one message.

The item "Item No." defines a number that identifies a record. The item "Time" defines a time at which a packet corresponding to a message is captured. The item "ID No." defines a number for identifying a request/response combination. The item "Protocol" defines information that represents which protocol the message depends on. The item "Request/Response" defines information that represents which request or response the message belongs to.

In the protocol-log management table 122, for example, information is defined by Item No. "1001", Time "00:00:00.100", ID No. "101", Protocol "HTTP", and Request/Response "Request".

This record corresponds to the contents of the first line of the restoration message 121. ID No. "101" is a number for identifying the group of Request/Response. The record of HTTP response, which is set to Item No. "1014", is also defined by ID No. "101". In other words, a response to the HTTP request represented by Item No. "1001" may be correlated with the HTTP response represented by Item No. "1014".

The message restoration unit 140 generates the restoration message 121 and the protocol-log management table 122 sequentially with reference to the packet storage file 111 stored in the packet storage unit 110. The unauthorized-sequence candidate generation unit 160 and the normal candidate generation unit 170 are able to execute the processes of the respective parts based on the protocol-log management table 122.

Next, the procedures of a process performed by the unauthorized-access detecting apparatus 100, which is constructed as described above, will be described in detail.

Figure 9:
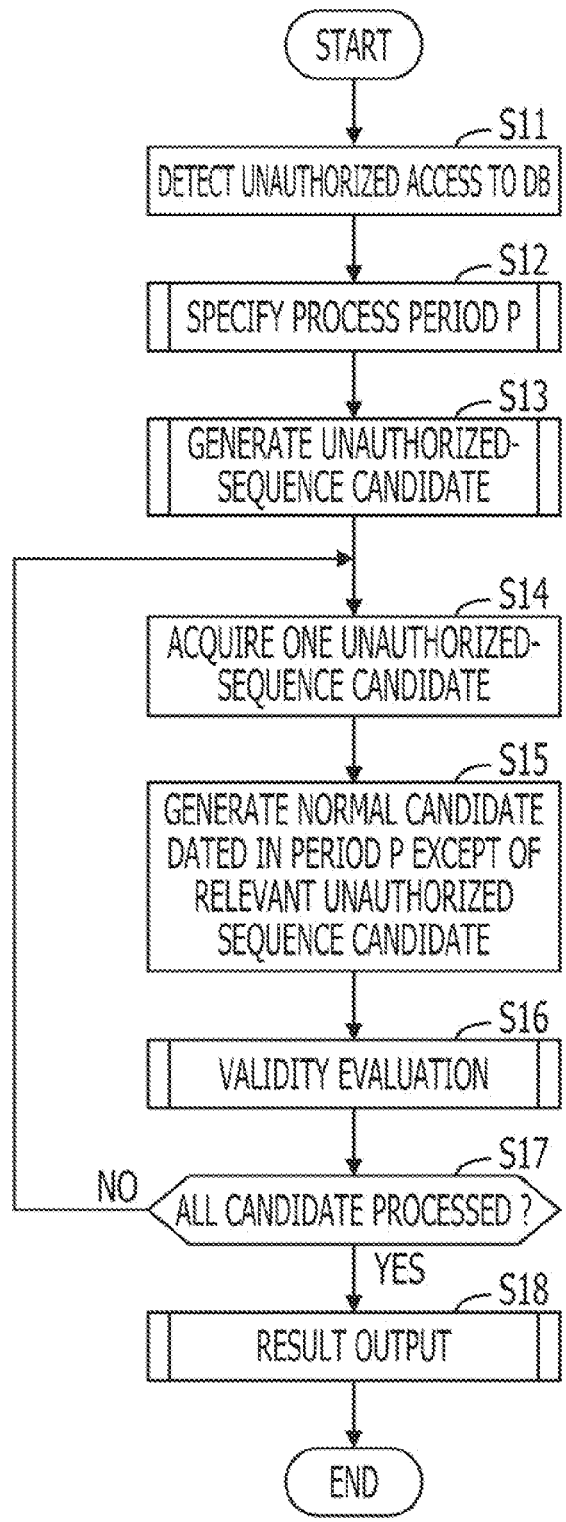
FIG. 9 is a flow chart illustrating an analyzing process.

FIG. 9 is a flowchart illustrating an analyzing process. Hereinafter, each operation of the process will be described along with operation numbers.

[Operation S11] The unauthorized access detection unit 150 monitors packet information stored in the packet storage unit 110 to detect the generation of an unauthorized access to the DB server 400. The unauthorized access detection unit 150 outputs a time at which a DB request for the unauthorized access is captured and a time at which a DB response is captured (these times are collectively referred to as "unauthorized-access generation times"), to the unauthorized-sequence candidate generation unit 160.

[Operation S12] The unauthorized-sequence candidate generation unit 160 identifies a process period P for detecting an unauthorized sequence with reference the generation time of unauthorized access.

[Operation 13] The unauthorized-sequence candidate generation unit 170 generates an unauthorized sequence candidate based on the message dated in the process period P that is the message recorded on the protocol-log management table 122 stored in the protocol-log storage unit 120. The unauthorized-sequence candidate generation unit 160 outputs a plurality of generated unauthorized sequence candidates to the normal candidate generation unit 170 and the analysis-result output unit 190.

[Operation S14] The normal candidate generation unit 170 acquires one unauthorized sequence candidate from among the unauthorized sequence candidates acquired from the unauthorized-sequence candidate generation unit 160.

[Operation S15] The normal candidate generation unit 170 is the message recorded on the protocol-log management table 122 stored in the protocol-log storage unit 120. The normal candidate generation unit 170 acquires a message group dated in the process period P. The normal candidate generation unit 170 generates the normal candidate that is not an unauthorized sequence candidate from the applicable message group. The normal candidate generation unit 170 outputs the generated normal candidate to the validity evaluation section 180.

[Operation S16] The validity evaluation section 180 evaluates the validity of the normal candidate acquired from the normal candidate generation unit 170. Then, the validity evaluation section 180 calculates the evaluation value which represents the degree of probability of the unauthorized sequence candidate based on the result of the evaluation. The validity evaluation section 180 outputs the calculated evaluation value to the analysis-result output unit 190. Here, a plurality of methods may be used for the evaluation of validity. The details of the evaluation method will be described later.

[Operation S17] The normal candidate generation unit 170 determines whether the evaluation of validity by the validity evaluation section 180 is completed on each unauthorized sequence candidate. If the evaluation is completed, the process proceeds to the operation S18. If the evaluation is not completed, the process returns to the operation S14.

[Operation S18] The analysis-result output unit 190 ranks each of the unauthorized sequence candidates and causes the monitor 11 to display the ranked unauthorized sequence candidates based on each unauthorized sequence candidate acquired from the unauthorized-sequence candidate generation unit 160 and the evaluation value of each unauthorized sequence candidate acquired from the validity evaluation section 180.

Thus, the unauthorized-access detecting apparatus 100 can identify the unauthorized sequence candidate having a high possibility of relevance to unauthorized access. Then, the unauthorized-access detecting apparatus 100 is able to display the result of the analysis to the system manager through the monitor 11.

Figure 10:
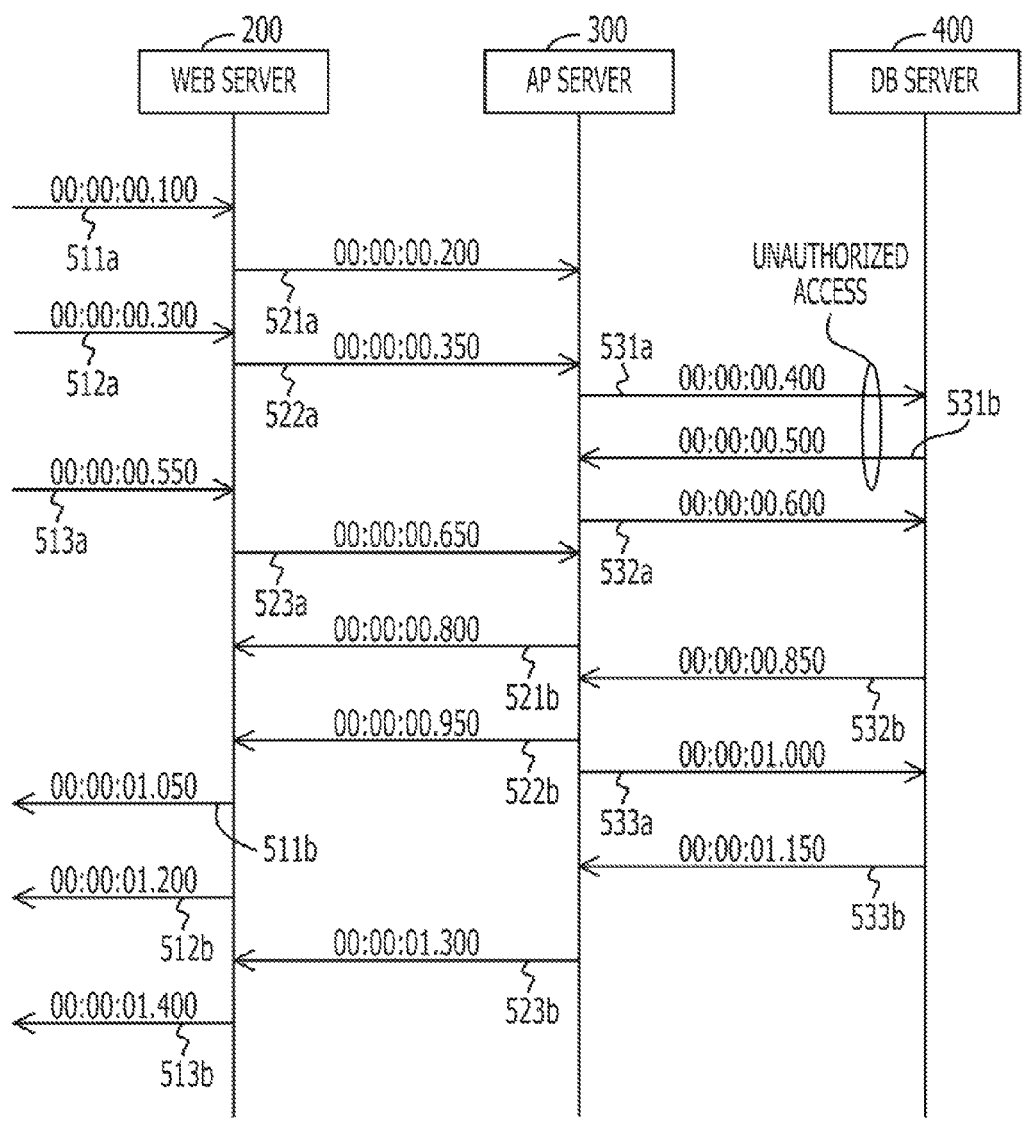
FIG. 10 is a diagram illustrating a specific example of a message transmitted and received between servers.

FIG. 10 is a diagram illustrating a specific example of a message transmitted and received between servers. FIG. 10 illustrates messages corresponding to the respective records represented on the protocol-log management table 122. Here, the messages are described together with times so that the chronological order of the messages will be easily recognized. Furthermore, reference numerals attached to the respective messages conform to the correspondence relationship of request and response. That is, a HTTP request 511*a* and a HTTP response 511*b* make up a pair. That is, a HTTP request 512*a* and a HTTP response 512*b* make up a pair. That is, a HTTP request 513*a* and a HTTP response 513*b* make up a pair. The same is also applicable to the relationship between the IIOP requests 521*a*, 522*a*, and 523*a* and the respective IIOP responses 521*b*, 522*b*, and 523*b*. The same is also applicable to the relationship between the DB requests 531*a*, 532*a*, and 533*a* and the respective DB responses 531*b*, 532*b*, and 533*b*.

Here, in the case that the unauthorized access detection unit 150 detects unauthorized access in the DB request 531*a* and the DB response 531*b* pair, the unauthorized access detection unit 150 outputs the generation time of the unauthorized access to the unauthorized-sequence candidate generation unit 160.

The unauthorized-sequence candidate generation unit 160 identifies a process period P based on the generation time of unauthorized access.

Subsequently, the process for identifying a process period represented in the operation S12 in FIG. 9 will be explained.

Figure 11:
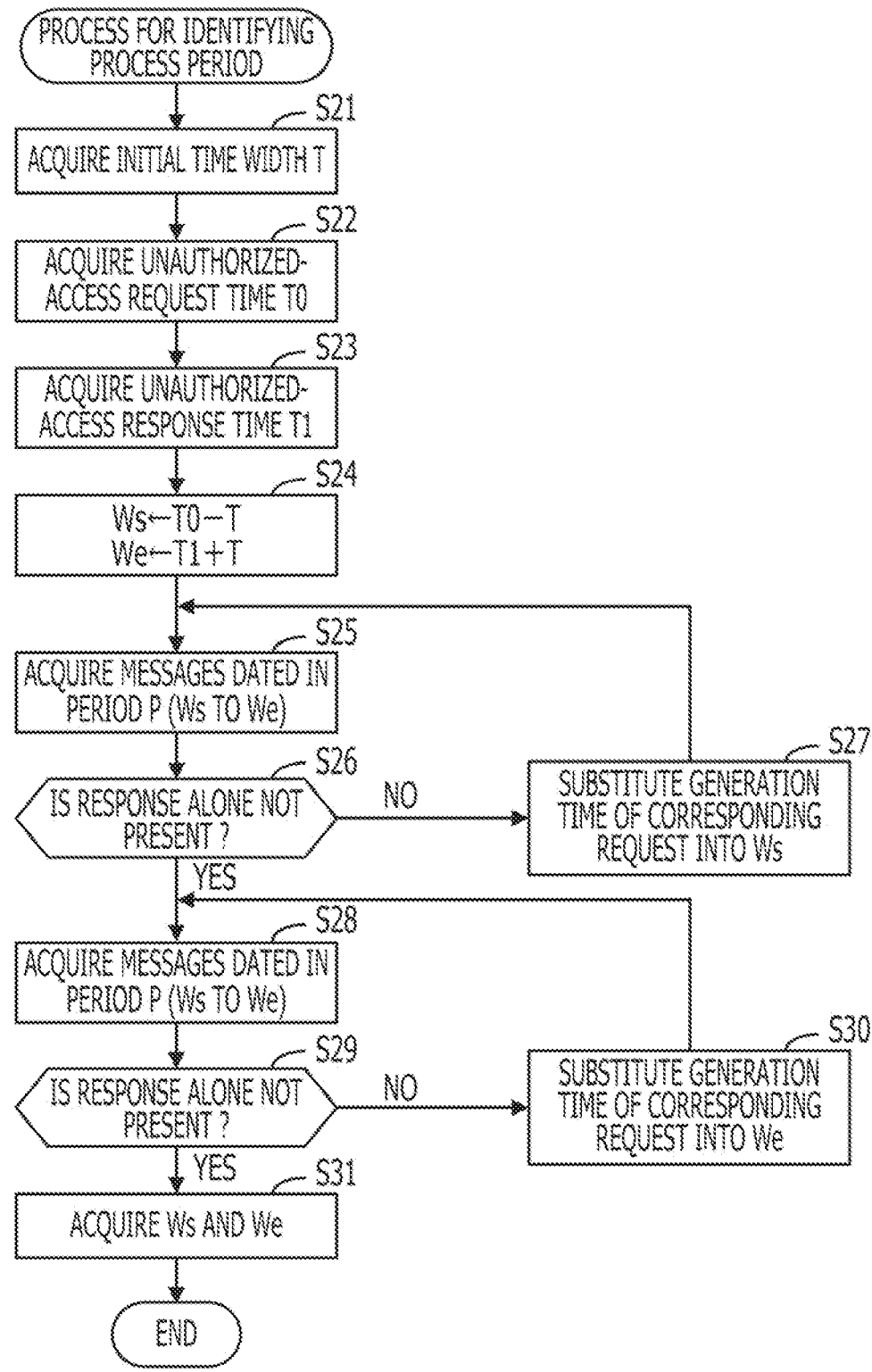
FIG. 11 is a flow chart illustrating a process for identifying a process period.

FIG. 11 is a flow chart illustrating a process for identifying the process period. Hereinafter, each operation of the process will be described along with operation numbers.

[Operation S21] The unauthorized-sequence candidate generation unit 160 acquires an initial time width T. Here, the initial time width value T is a value determined by the system manager in advance to determine an initial value for assuming a certain time width as a process period with respect to the generation of unauthorized access.

[Operation S22] The unauthorized-sequence candidate generation unit 160 acquires a time corresponding to the DB request as a request time T0 among the generation times of unauthorized access acquired from the unauthorized access detection unit 150.

[Operation S23] The unauthorized-sequence candidate generation unit 160 acquires the time corresponding to the DB response as a response time T1 among the generation times of unauthorized access.

[Operation S24] The unauthorized-sequence candidate generation unit 160 substitutes "T0−T" into Ws. The unauthorized-sequence candidate generation unit 160 substitutes "T1+T" into We. As a result, period P is provisionally defined. That is, the period P is a period between Ws and We. Here, the calculation result of "T0−T" represents a past time which is the amount of time T back from the point of time T0. The calculation result of "T1+T" represents the time in the future, which is the amount of time T extending from the point of time T1.

[Operation S25] The unauthorized-sequence candidate generation unit 160 acquires a message dated in period P based on the protocol-log management table 122 stored in the protocol-log storage unit 120.

[Operation S26] The unauthorized-sequence candidate generation unit 160 determines whether a response which does not have any paired request exists. If a response which does not have any paired request exists, the process proceeds to operation S27. If all the responses have corresponding paired requests, the process proceeds to operation S28. For example, the present determination may be performed by identifying the response which does not have any paired request with reference to the identification number defined in the protocol-log management table 122 to perform the present determination.

[Operation S27] The unauthorized-sequence candidate generation unit 160 identifies the request corresponding to the response identified in the operation S26 with reference to the message dated in the period (period before Ws), which is not included in the period P, in the protocol-log management table 122. For example, the protocol-log management table 122 is able to identify a request to be paired with the corresponding response by referring to the identification number defined in the protocol-log management table 122. The unauthorized-sequence candidate generation unit 160 substitutes the generation time of the request into Ws. Then, the process returns to the operation S25. The generation time of each message is acquirable by referring to the time set as protocol-log management table 122.

[Operation S28] The unauthorized-sequence candidate generation unit 160 acquires the message dated in the period P based on the protocol-log management table 122.

[Operation S29] The unauthorized-sequence candidate generation unit 160 determines whether a request which does not correspond to any response exists in the acquired message. If a request which does not have a paired response exists, the process proceeds to operation S30. If all the requests have paired responses, the process proceeds to operation S31. For example, the present determination may be performed by identifying the request which does not have any paired response with reference to the identification number defined in the protocol-log management table 122 to perform the present determination.

[Operation S30] The unauthorized-sequence candidate generation unit 160 identifies the response corresponding to the request identified in the operation S29 with reference to the message dated in the period (period after We), which is not included in the period P, in the protocol-log management table 122. For example, the protocol-log management table 122 is able to identify a response to be paired with the corresponding request by referring to the identification number defined in the protocol-log management table 122. The unauthorized-sequence candidate generation unit 160 substitutes the generation time of the response concerned into Ws. Then, the process returns to the operation S28.

[Operation S31] The unauthorized-sequence candidate generation unit 160 acquires Ws and We as parameters that determine the period P.

In this way, the unauthorized-sequence candidate generation unit 160 identifies the process period P. The period P is determined so that a response having no paired request and a request having no paired response are not included.

Figure 12A:
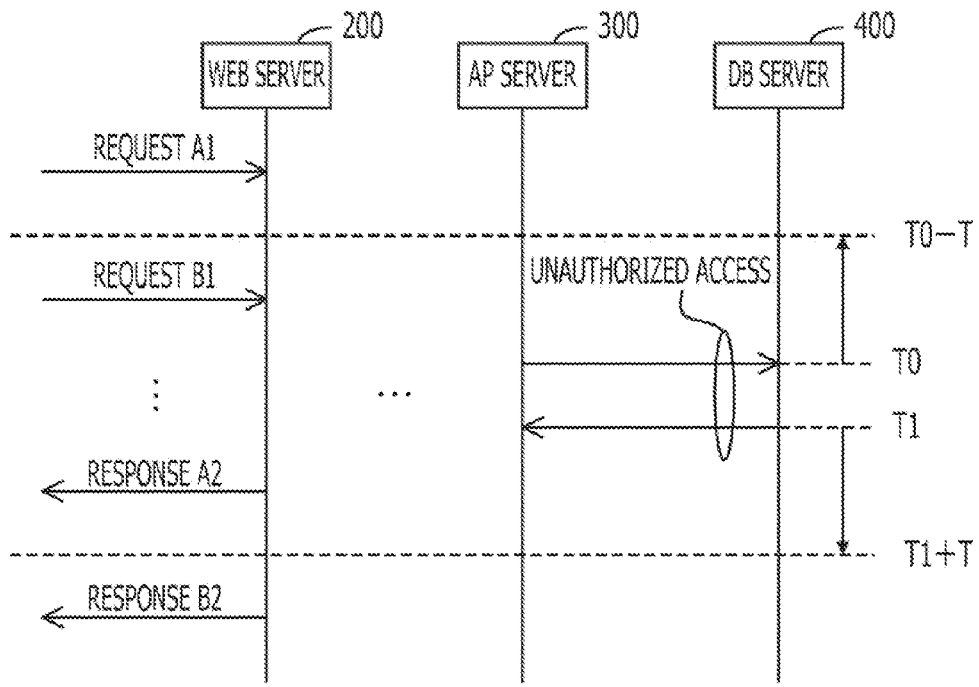
FIGS. 12A and 12B are diagrams each illustrating a process period.
Figure 12B:
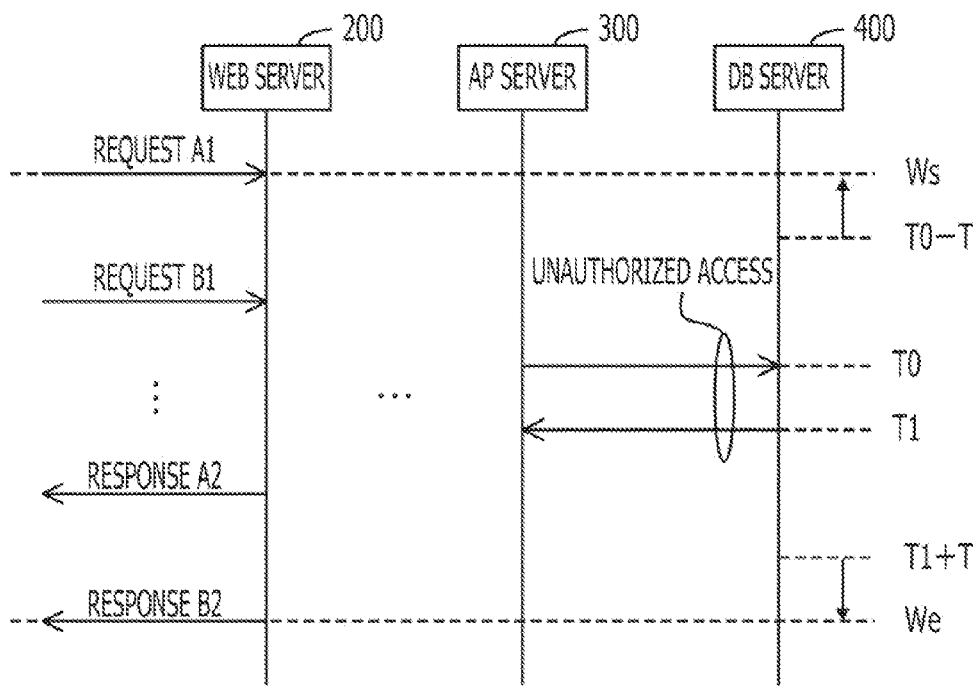

FIGS. 12A and 12B are diagrams each illustrating a process period. FIG. 12A illustrates a period P which is provisionally defined. In FIGS. 12A and 12B, a HTTP request A1 and a HTTP response A2 are paired with each other. In addition, a HTTP request B1 and a HTTP response B2 are paired with each other. The time corresponding to a DB request of unauthorized access is T0. The time corresponding to a DB response of unauthorized access is T1. The unauthorized-sequence candidate generation unit 160 acquires the period P of from "Ws=T0−T" to "We=T1−T".

When the unauthorized-sequence candidate generation unit 160 detects that the HTTP request A1 to the HTTP response A2 is not dated in the present period P, the unauthorized-sequence candidate generation unit 160 substitutes the generation time of the HTTP request A1 into Ws. Therefore, the period P is updated so that the past period will be included. Furthermore, when the unauthorized-sequence candidate generation unit 160 detects that the response B2 to the HTTP request B1 is not dated in the present period P, the unauthorized-sequence candidate generation unit 160 substitutes the generation time of the HTTP response B2 into We. Therefore, the period P is updated so that a future period subsequent to the period P will be included.

FIG. 12B illustrates the period P determined as described above. The period P corresponds to the period from Ws to We, which is newly obtained by the above process.

Here, even if a sequence is generated using the corresponding message in the subsequent stage when a response which does not have any paired request or the like exists, the sequence is obviously incorrect. In addition, if the evaluation is performed using the incorrectly generated sequence, the accuracy of an evaluation result may be decreased.

Therefore, the accuracy of the subsequent processing may be improved by determining a period so that a message corresponding to either the request or response is dated in the period to reduce or prevent the incorrect generation of the sequence.

Next, the process for generating an unauthorized sequence candidate illustrated in the operation S13 in FIG. 9 will be described.

Figure 13:
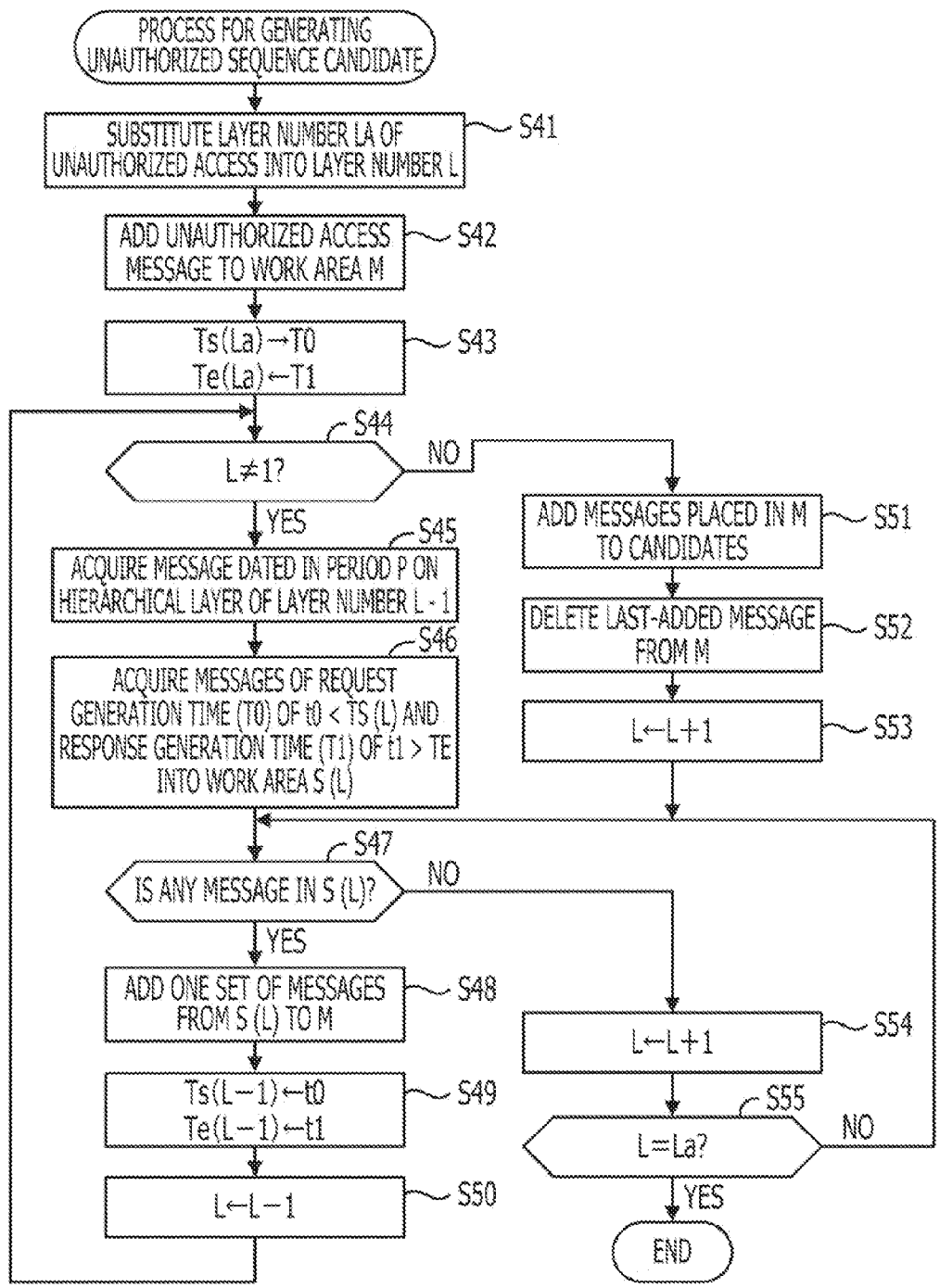
FIG. 13 is a flow chart illustrating a process for generating an unauthorized sequence candidate.

FIG. 13 is a flow chart illustrating a process for generating an unauthorized sequence candidate. Hereinafter, each operation of the process will be described along with operation numbers. Before starting the following process, the unauthorized-sequence candidate generation unit 160 shall abandon all the information stored in work areas M and S (L).

[Operation S41] The unauthorized-sequence candidate generation unit 160 substitutes the layer number La of a hierarchical layer where unauthorized access is detected into layer number L. Specifically, the layer number La=3 of the DB server 400 is substituted into L. That is, L is initialized to L=3.

[Operation S42] The unauthorized-sequence candidate generation unit 160 adds a record corresponding to an unauthorized access message to the work area M with reference to the protocol-log management table 122 stored in the protocol-log storage unit 120. Specifically, a record (Item No. "1005") corresponding to a DB request 531a and a record (Item No. "1006") corresponding to a DB response 531b are added to the work area M.

[Operation S43] The unauthorized-sequence candidate generation unit 160 substitutes T0 into the request time Ts (La)=Ts (3). The unauthorized-sequence candidate generation unit 160 substitutes T1 into the response time Te (La)=Ts (3). Here, T0 is a generation time of the DB request 531a. T1 is a generation time of the DB response 531b. The unauthorized-sequence candidate generation unit 160 may be a time at which T0 and T1 are acquired from the unauthorized access detection unit or from the protocol-log management table 122.

[Operation S44] The unauthorized-sequence candidate generation unit 160 determines whether L is equal to 1. If L is not equal to 1, the process proceeds to operation S45. If L is equal to 1, the process proceeds to operation S51.

[Operation S45] The unauthorized-sequence candidate generation unit 160 acquires a message dated in the period P on the hierarchical layer of layer number L−1. The unauthorized-sequence candidate generation unit 160 is able to acquire the message of the hierarchical layer of L−1 with reference to, for example, a protocol defined in the protocol-log management table 122. For example, if L−1=3−1=2, the hierarchical layer represented by the hierarchy number is the hierarchical layer of the AP server 300. Therefore, among the messages in the protocol-log management table 122, only the protocol acquires the record of "IIOP". For example, if L−1=2−1=1, the hierarchical layer represented by the hierarchy number is the hierarchical layer of the Web server 200. Therefore, among the messages in the protocol-log management table 122, only the protocol acquires the record of "HTTP".

[Operation S46] The unauthorized-sequence candidate generation unit 160 identifies a pair having a request generation time (t0) of t0<Ts (L) and a response generation time (t1) of t1>Te among the pair of messages acquired in the operation S45. Then, a pair of records corresponding to the pair of the messages is added to the work area S (L).

Here, t0<Ts (L) illustrates that t0 is the past time zone from Ts (L). In addition, t1>Te (L) illustrates that t1 is the future time zone from Te (L).

[Operation S47] The unauthorized-sequence candidate generation unit 160 determines whether a message exists in the work area S (L). If a message exists in S (L), the process proceeds to operation S48. If a message does not exist in S (L), the process proceeds to operation S54.

[Operation S48] The unauthorized-sequence candidate generation unit 160 extracts one set of records of a request/response from the work area S (L) and adds the extracted set to the work area M. Furthermore, in the case of the addition, the addition is performed according to the chronological order of the time-stamps of the records. The unauthorized-sequence candidate generation unit 160 deletes a pair of extracted records from the work area S (L).

[Operation S49] The unauthorized-sequence candidate generation unit 160 substitutes the generation time t0 of a request among the extracted records into the request time Ts (L−1). In addition, the unauthorized-sequence candidate generation unit 160 substitutes the generation time t1 of a response among the extracted records into the response-times Te (L−1). These times are acquirable from the times set in the respective records.

[Operation S50] The unauthorized-sequence candidate generation unit 160 substitutes L−1 into the layer number L. Then, the process returns to the operation S44.

[Operation S51] The unauthorized-sequence candidate generation unit 160 acquires a record corresponding to each message placed in the work area M as an unauthorized sequence candidate.

[Operation S52] The unauthorized-sequence candidate generation unit 160 deletes the record corresponding to the last added message among the records corresponding to the respective messages placed in the work area M.

[Operation S53] The unauthorized-sequence candidate generation unit 160 substitutes L+1 into the layer number L. Then, the process returns to the operation S47.

[Operation S54] The unauthorized-sequence candidate generation unit 160 substitutes L+1 into the layer number L.

[Operation S55] The unauthorized-sequence candidate generation unit 160 determines whether the layer number L is substantially equal to La. If L substantially equals La, the process is completed. If L does not substantially equal La, the process proceeds to operation S47.

Thus, unauthorized-sequence candidate generation unit 160 generates an unauthorized sequence candidate from the message in the process period P.

The unauthorized-sequence candidate generation unit 160 can prevent the inexhaustible generation of unauthorized sequence candidates by generating unauthorized sequence candidates based on the specified period P. For example, even if messages with wide intervals of the generation time correlated with each other, the validity of the unauthorized sequence candidate obtained may be low. Thus, the period P is determined appropriately to avoid the generation of any useless unauthorized sequence candidate. As a result, it is possible to exclude the subsequent redundant processing and efficiently execute the analyzing process.

Hereafter, the specific example of the process for generating an unauthorized sequence candidate will be described.

Figure 14:
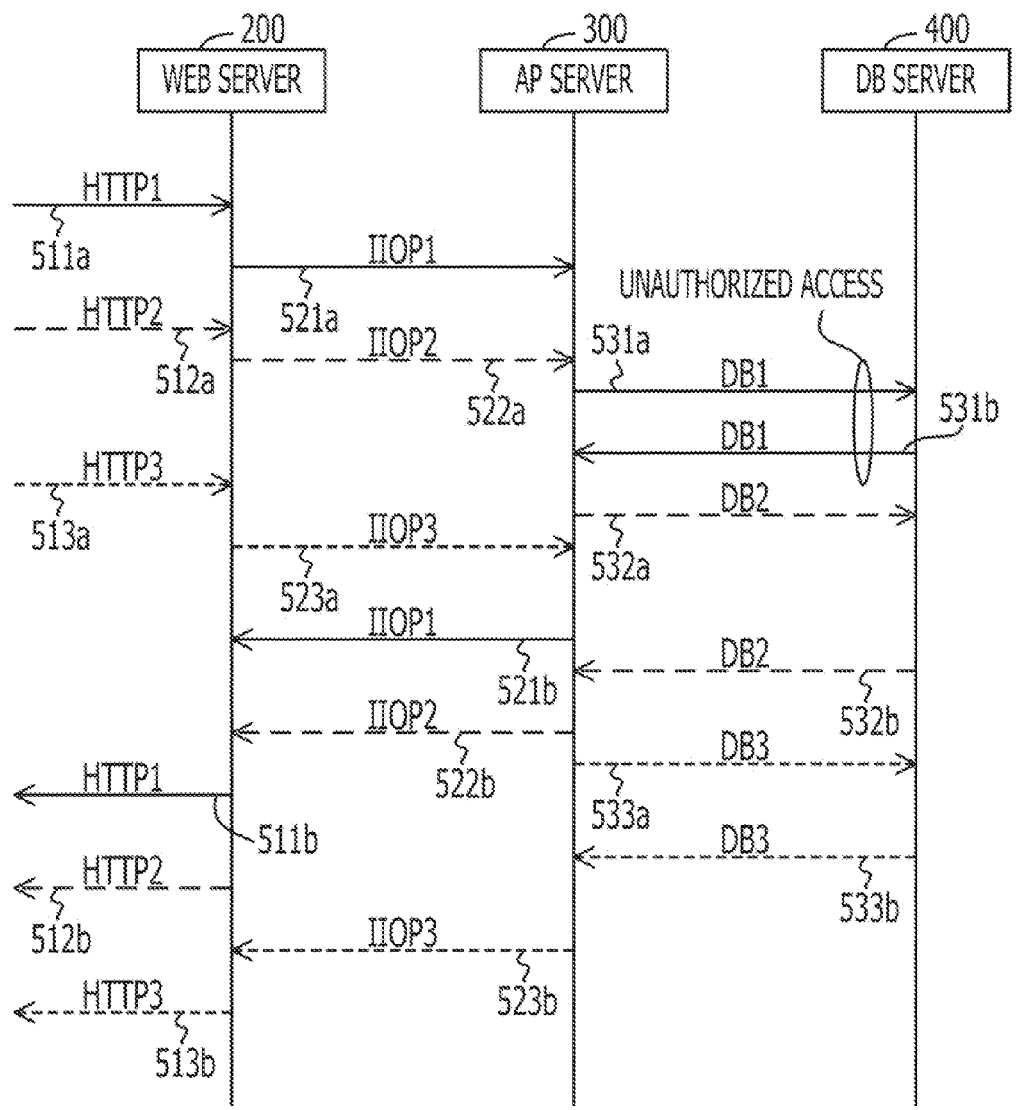
FIG. 14 is a diagram illustrating a specific example of the process for generating an unauthorized sequence candidate.

FIG. 14 is a first diagram illustrating a specific example of the process for generating an unauthorized sequence candidate. Here, the unauthorized-sequence candidate generation unit 160 acquires a period from the generation time Ws of the HTTP request 511a to the generation time We of the HTTP response 513b as a period P. In this case, each of the messages illustrated in FIG. 10 is dated in the period P. The protocol and the number are given to each message so that it may easily identify messages which will be paired with each other in the description of the unauthorized sequence candidate. For example, the HTTP request 511a ("HTTP1") and the HTTP response 511b ("HTTP1") form a pair of messages. When detecting unauthorized access by the DB request 531a and the DB response 531b, the unauthorized-sequence candidate generation unit 160 generates a plurality of unauthorized sequence candidates as follows according to each operation illustrated in FIG. 13.

First, the unauthorized-sequence candidate generation unit 160 acquires the following pairs of messages, where a request is generated before the DB request 531a and a response is generated after the DB response 531b.

First pair: the HTTP request 511a and the HTTP response 511b pair;

Second pair: the HTTP request 512a and the HTTP response 512b pair;

Third pair: the IIOP request 521a and the IIOP response 521b pair; and

Fourth pair: a set of the IIOP request 522a and the IIOP response 522b pair.

The unauthorized-sequence candidate generation unit 160 further combines the pairs of the acquired messages in consideration of the chronological context to generate an unauthorized sequence candidate.

Figure 15A:
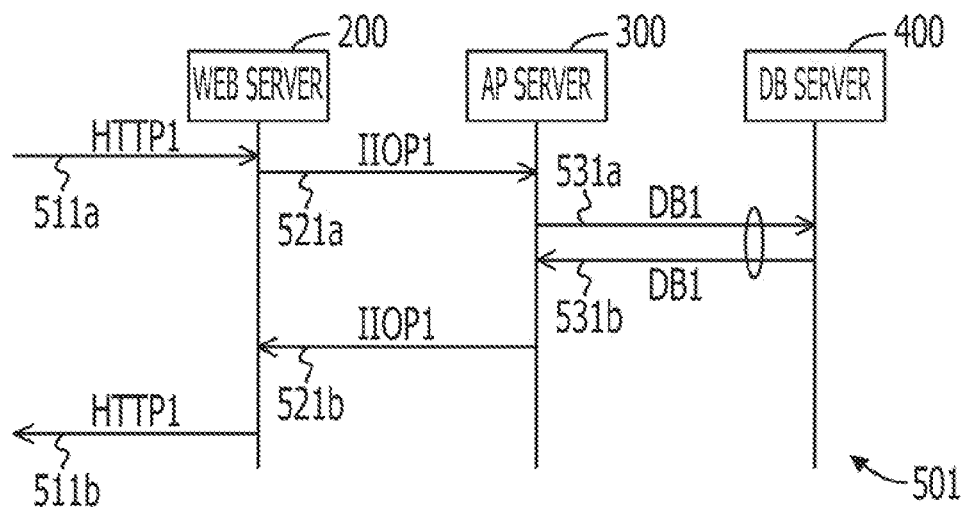
FIGS. 15A to 15C are diagrams each illustrating a specific example of the process for generating an unauthorized sequence candidate.
Figure 15B:
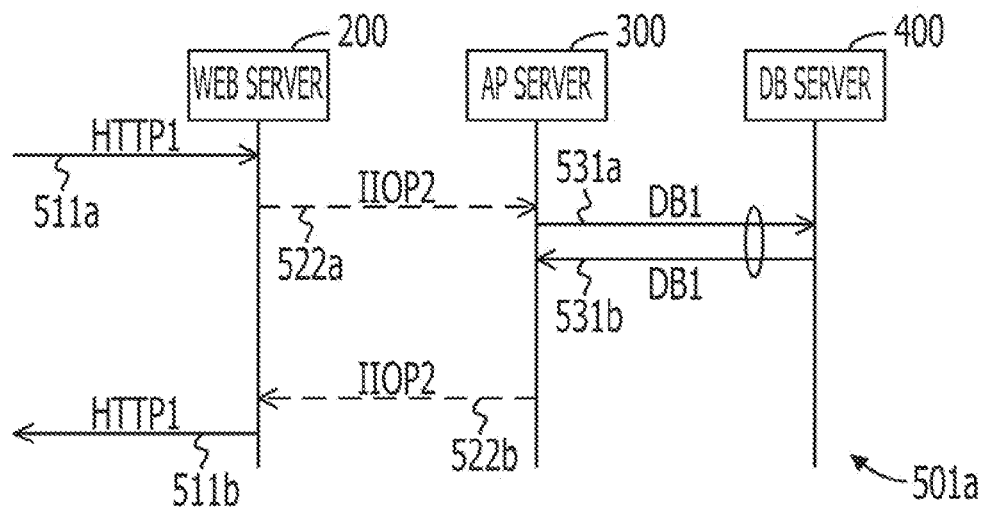
Figure 15C:
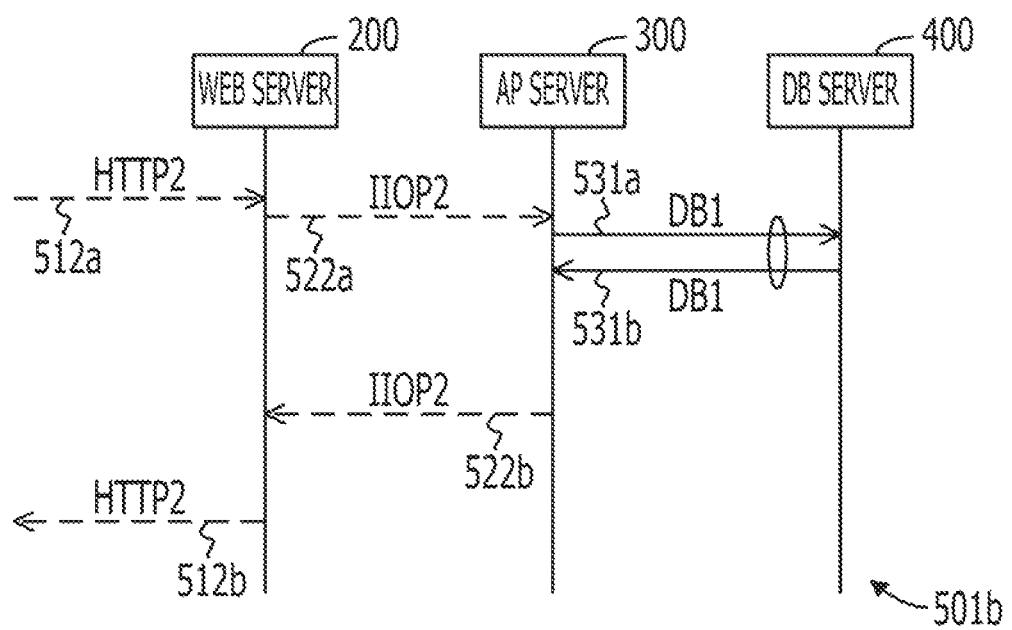

FIGS. 15A to 15C are diagrams each illustrating a specific example of the process for generating an unauthorized sequence candidate. The unauthorized-sequence candidate generation unit 160 generates the following unauthorized sequence candidates by combining the first to fourth pairs described above with a pair of the DB request 531a and the DB response 531b (fifth pair).

In FIG. 15A, the unauthorized sequence candidate 501 is an unauthorized sequence candidate generated by combining the first pair, the third pair, and the fifth pair.

In FIG. 15B, the unauthorized sequence candidate 501a is an unauthorized sequence candidate generated by combining the first pair, the fourth pair, and the fifth pair.

In FIG. 15C, the unauthorized sequence candidate 501b is an unauthorized sequence candidate generated combining the second pair, the fourth pair, and the fifth pair.

Since the chronological context of the communication procedure between hierarchical layers is not consistent, the second pair and the third pair cannot be combined.

The unauthorized-sequence candidate generation unit 160 outputs the unauthorized sequence candidates generated in this way to the normal candidate generation unit 170.

Figure 16A:
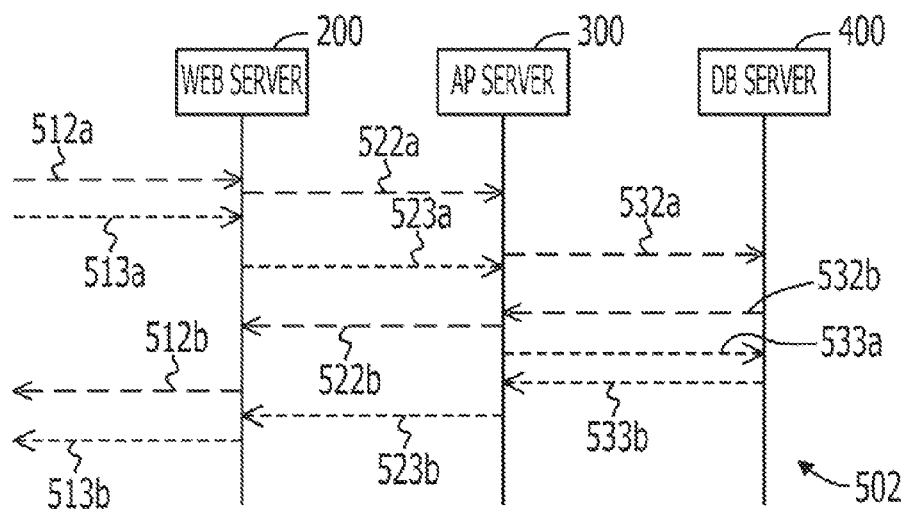
FIGS. 16A to 16C are diagrams each illustrating a specific example of a normal candidate.
Figure 16B:
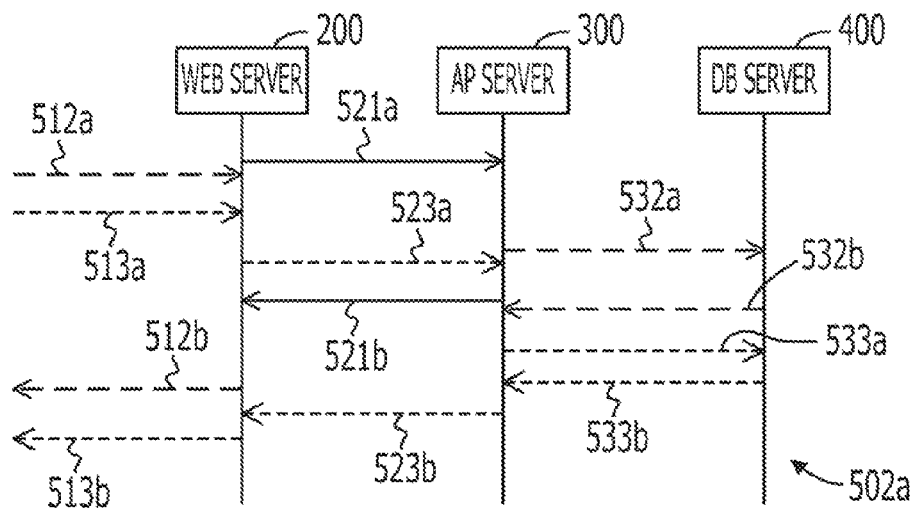
Figure 16C:
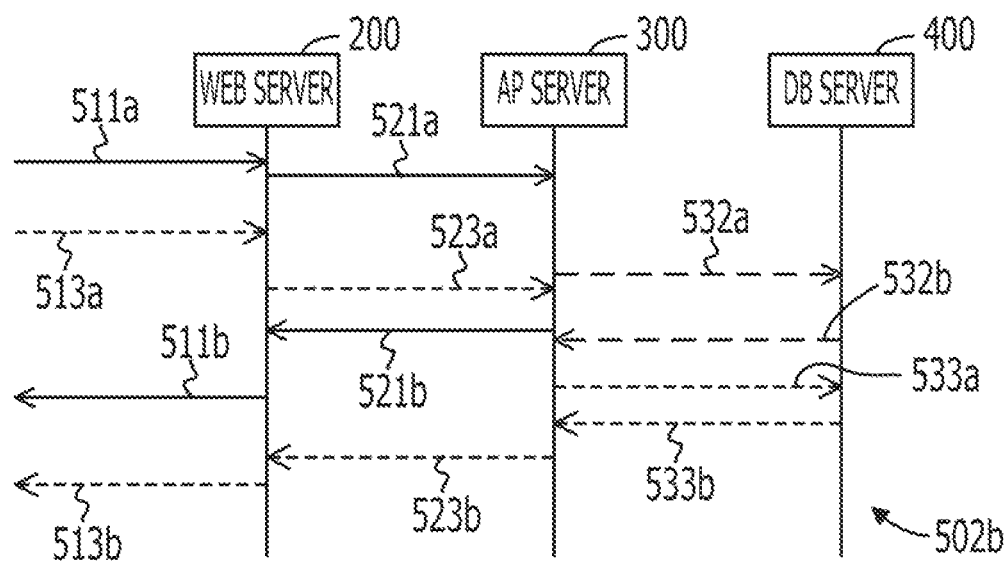

FIGS. 16A to 16C are diagrams each illustrating a specific example of a normal candidate. Among messages dated in the period P, the normal candidate generation unit 170 acquires messages except for unauthorized sequence candidates with reference to the protocol-log management table 122 stored in the protocol-log storage unit 120.

FIG. 16A, the normal candidate 502 represents messages except for a message corresponding to the unauthorized sequence candidate 501 from the protocol-log management table 122.

FIG. 16B, the normal candidate 502a represents messages except for a message corresponding to the unauthorized sequence candidate 501a from the protocol-log management table 122.

FIG. 16C, the normal candidate 502b represents messages except for a message corresponding to the unauthorized sequence candidate 501b from the protocol-log management table 122.

This process is equivalent to the process in the operation S15 of FIG. 9.

The normal candidate generation unit 170 outputs each normal candidate to the validity evaluation section 180.

Next, the validity evaluation process represented in the operation S16 of FIG. 9 will be described. Here, a plurality of methods may be used for the evaluation of validity. Hereinafter, three exemplary methods will be described. The methods are a method based on the number of transactions, a method based on a process time on each hierarchical layer, and a method based on a request issue time on each hierarchical layer. Any of these methods may be used or two or more of them may be used in combination. The system manager may previously determine which method will be used in the unauthorized-access detecting apparatus 100.

First, the validity evaluation process based on the number of transactions will be described.

Figure 17:
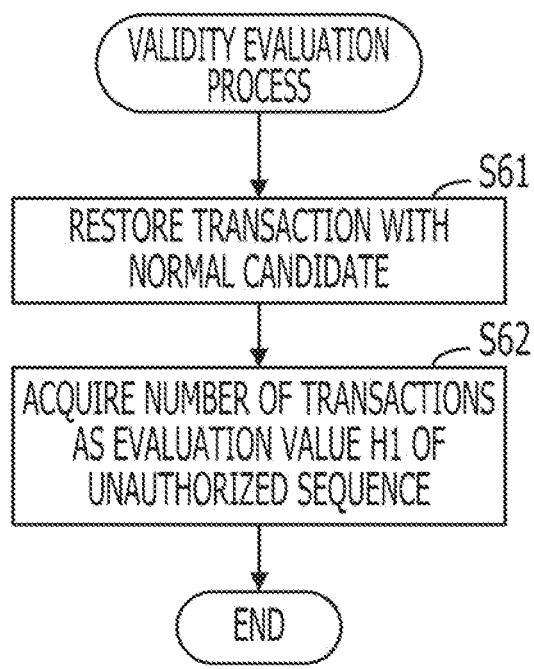
FIG. 17 is a flow chart illustrating a validity evaluation process.

FIG. 17 is a first flow chart illustrating a validity evaluation process. Hereinafter, each operation of the process will be described along with operation numbers.

[Operation S61] Based on a normal candidate acquired from the normal candidate generation unit 170, the validity evaluation section 180 restores a transaction including messages in the normal candidate. As a process for restoring a transaction, for example, a method described in Japanese Unexamined Patent Application Publication No. 2006-011683 may be used.

[Operation S62] The validity evaluation section 180 acquires the number of restored transactions as an evaluation value H1 of the unauthorized sequence candidate corresponding to the normal candidate. Thus, the validity evaluation section 180 acquires the evaluation value H1 based on the restored number of transactions. Here, the higher the number of restored transactions, the higher the normality of the restored normal candidate. For this reason, the higher the evaluation value H1, the higher the validity of the validity of the unauthorized candidate.

Figure 18A:
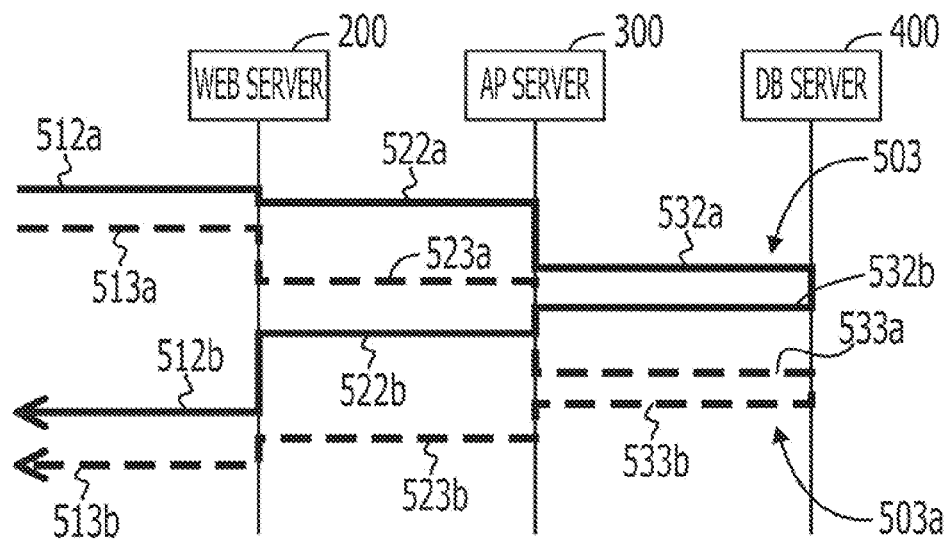
FIGS. 18A to 18C are diagrams each illustrating a specific example of validity evaluation.
Figure 18B:
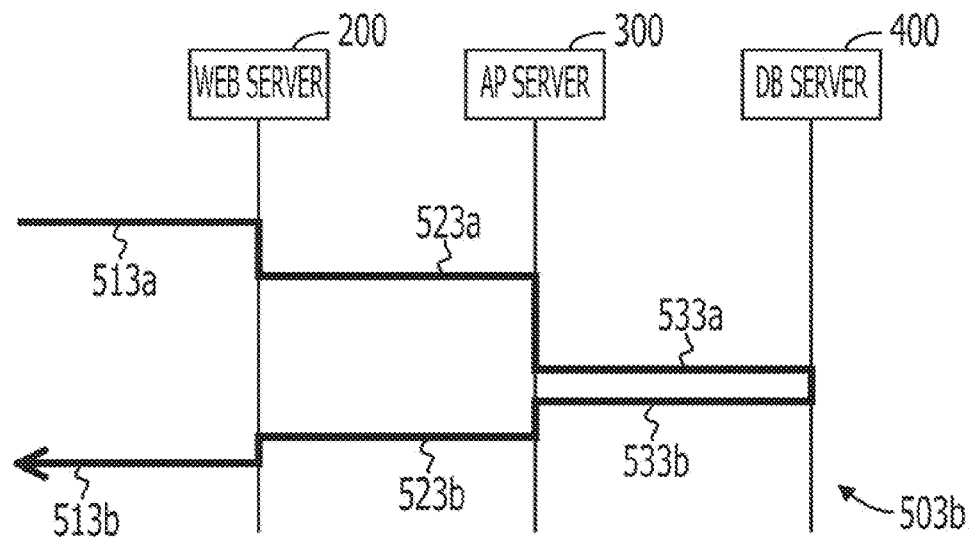
Figure 18C:
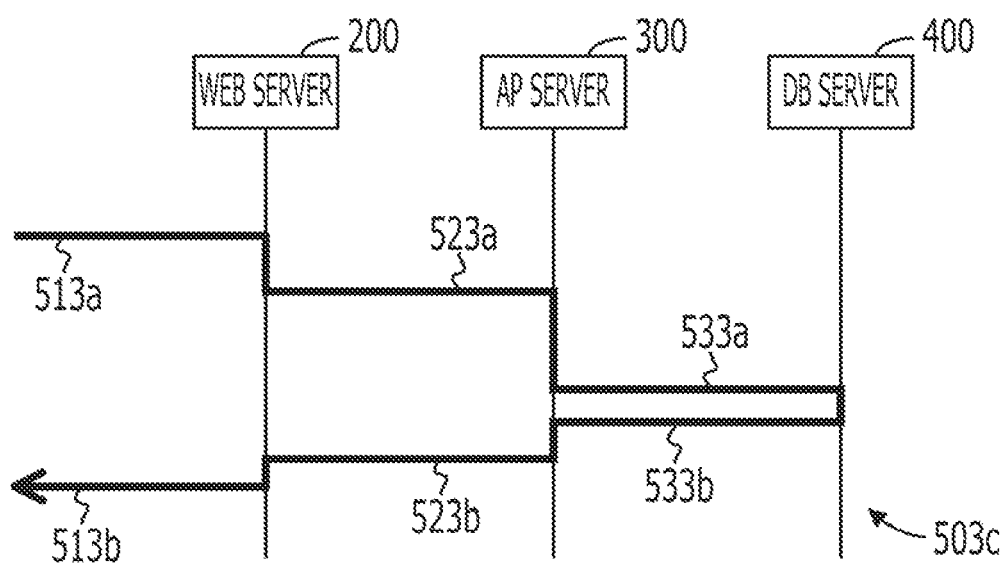

FIGS. 18A to 18C are diagrams each illustrating a specific example of validity evaluation. The validity evaluation section 180 restores a transaction based on the normal candidate acquired from the normal candidate generation unit 170. Specifically, the validity evaluation section 180 identifies a pair of messages which may be formed by a chronological inclusive relation like an unauthorized sequence candidate, thereby restoring a plurality of transactions in the normal candidate.

In FIG. 18A, transactions 503 and 503a are transactions restored based on the normal candidate 502. In this case, the validity evaluation section 180 obtains the evaluation value H1=2 for the unauthorized sequence candidate 501.

In FIG. 18B, the transaction 503b is a transaction restored based on the normal candidate 502a. In this case, the validity evaluation section 180 obtains the evaluation value H1=1 for the unauthorized sequence candidate 501a.

In FIG. 18C, the transaction 503c is a transaction restored based on the normal candidate 502b. In this case, the validity evaluation section 180 obtains the evaluation value H1=1 for the unauthorized sequence candidate 501b.

In this case, the validity of the unauthorized sequence candidate 501 of FIG. 18A where the evaluation value H1 becomes the maximum is the highest.

Next, the validity evaluation process based on the processing time in each hierarchical layer is explained.

Figure 19:
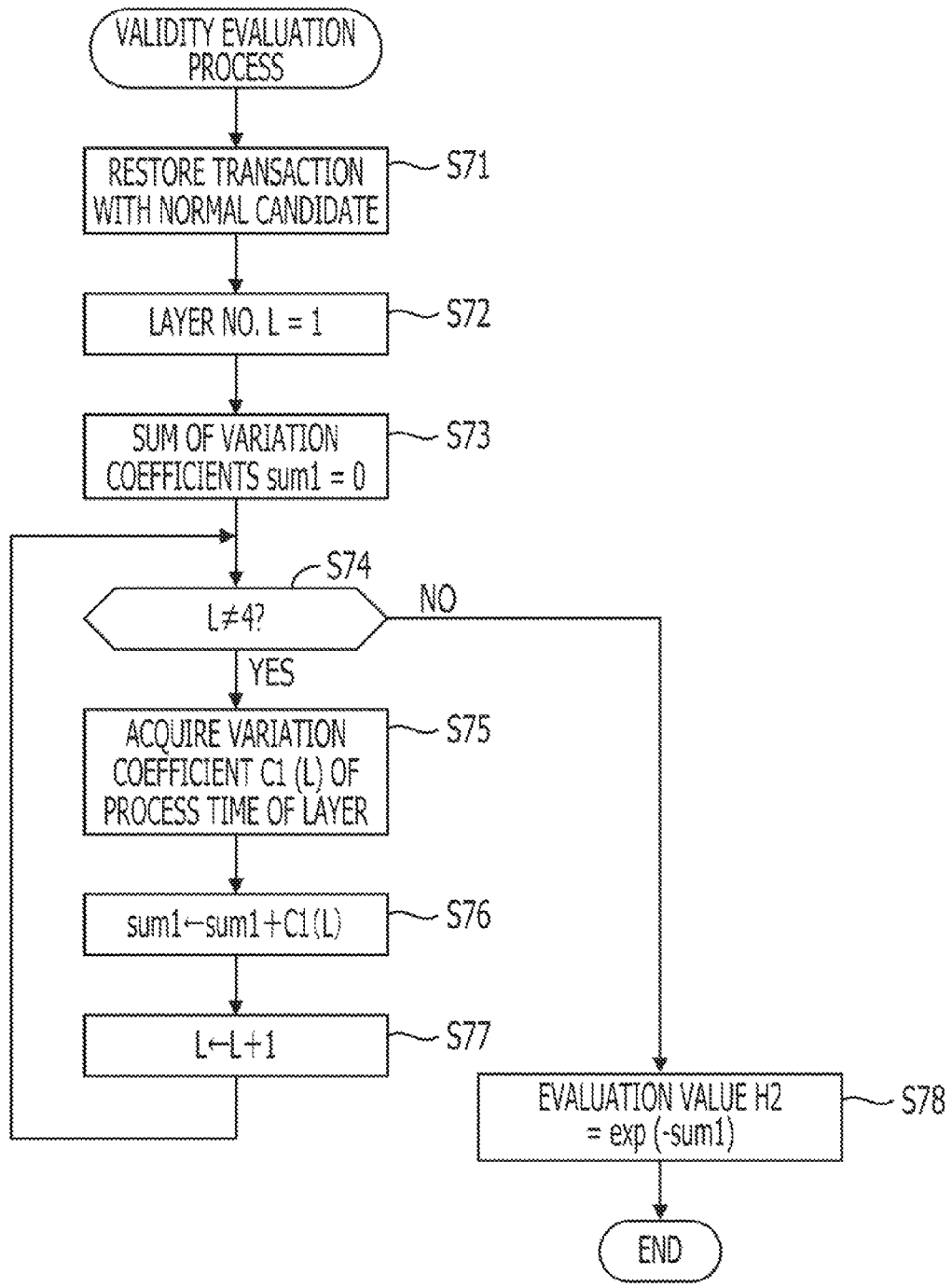
FIG. 19 is a flow chart illustrating the validity evaluation process.

FIG. 19 is a flow chart illustrating the validity evaluation process. Hereinafter, each operation of the process will be described along with operation numbers.

[Operation S71] Based on a normal candidate acquired from the normal candidate generation unit 170, the validity evaluation section 180 restores a transaction including messages in the normal candidate in a manner similar to the operation S61.

[Operation S72] The validity evaluation section 180 substitutes the number of the top layer number into the number L. That is, L=1.

[Operation S73] The validity evaluation section 180 substitutes "0" into the sum of variation coefficients sum1.

[Operation S74] The validity evaluation section 180 determines whether the layer number L is substantially equal to the lowest layer number+1. That is, if L is not expressed by L=3+1=4, the process proceeds to operation S75. If L is expressed by L=4, the process proceeds to operation S78.

[Operation S75] The validity evaluation section 180 calculates the variance of the processing time on the hierarchical layer represented by the layer number L for each restored transaction. The validity evaluation section 180 calculates a coefficient of variation C1 (L) based on variance. Here, a coefficient of variation C may be calculated by the following equation.

$$C = \frac{\sqrt{\sigma^2}}{\tau} \quad (1)$$

wherein $\sigma^2$ represents variance and $\tau$ represents the arithmetical average of the processing time.

[Operation S76] The validity evaluation section 180 substitutes sum1+C1 (L) into the sum of variation coefficient sum1.

[Operation S77] The validity evaluation section 180 substitutes L+1 into the layer number L.

[Operation S78] The validity evaluation section 180 calculates the evaluation value H2 of the unauthorized sequence candidate corresponding to the normal candidate concerned as H2=exp (−sum1).

Thus, the validity evaluation section 180 acquires the evaluation value H2 based on the processing time on each hierarchical layer. Here, with respect to each restored transaction, the normality of the normal candidate used for restoration may be high as the variation of the processing time on each hierarchical layer. This is because it is common to perform a routine business process in the business system. There is no substantial difference among the process times of the respective process operations. Therefore, the higher the evaluation value H2 increases, the higher the validity of the unauthorized sequence candidate may increase.

Next, the validity evaluation process based on the request issue time on each hierarchical layer will be described.

Figure 20:
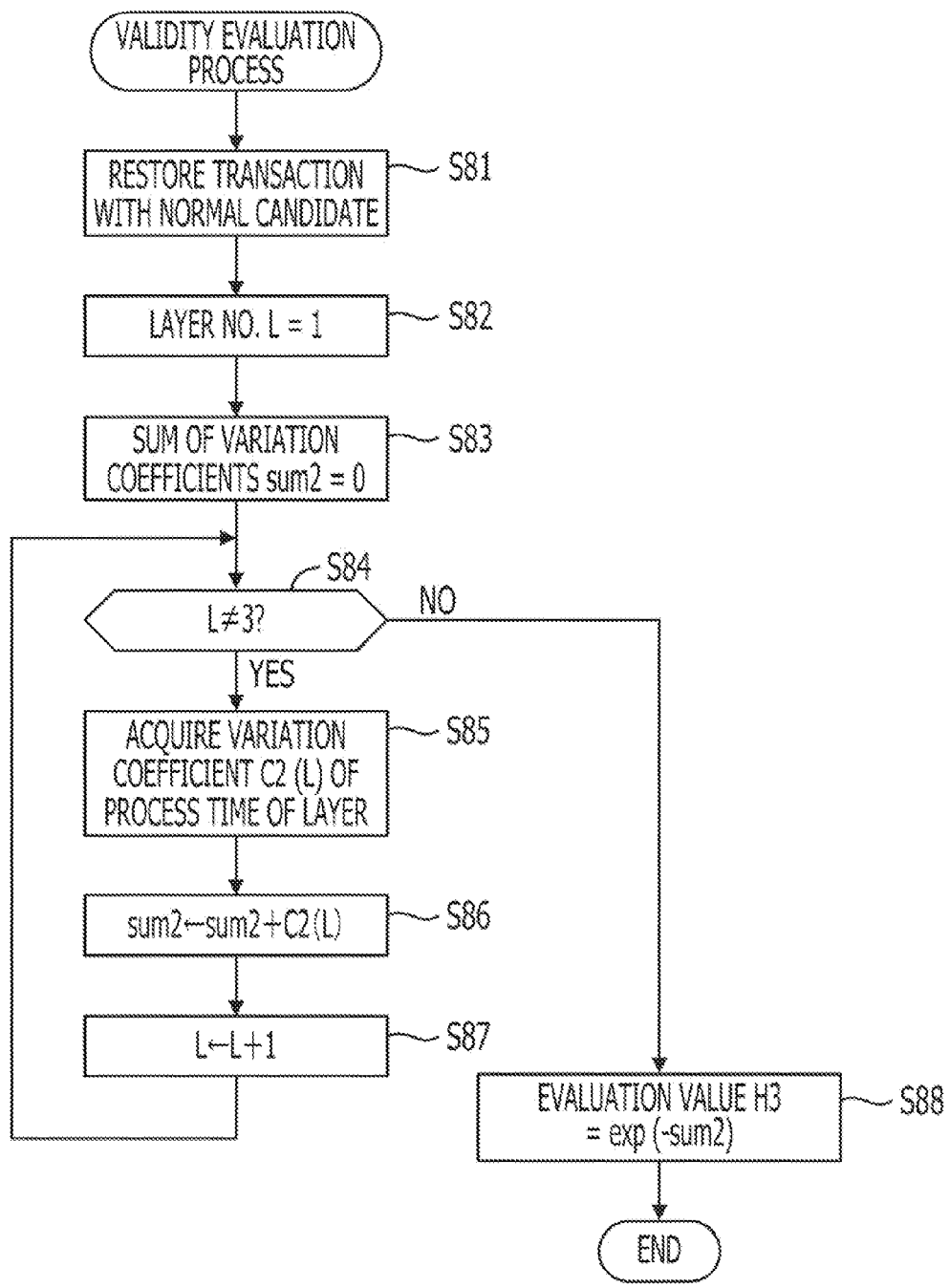
FIG. 20 is a flow chart illustrating the validity evaluation process.

FIG. 20 is a flow chart illustrating the validity evaluation process. Hereinafter, each operation of the process will be described along with operation numbers.

[Operation S81] Based on a normal candidate acquired from the normal candidate generation unit 170, the validity evaluation section 180 restores a transaction including messages in the normal candidate in a manner similar to the operation S61.

[Operation S82] The validity evaluation section 180 substitutes the number of the top layer into the number L. That is, L=1.

[Operation S83] The validity evaluation section 180 substitutes "0" into the sum of variation coefficients sum2.

[Operation S84] The validity evaluation section 180 determines whether the layer number L is substantially equal to the lowest layer number. That is, if L is not expressed by L=3, the process proceeds to operation S85. If L is expressed by L=3, the process proceeds to operation S88.

[Operation S85] The validity evaluation section 180 calculates variance of the request issue time on the hierarchical layer represented by the layer number L for each restored transaction. The validity evaluation section 180 calculates the coefficient of variation C2 (L) based on variance. Here, the coefficient of variation C is calculated by the equation (1). However, in the equation (1), $\tau$ represents a request issue time.

[Operation S86] The validity evaluation section 180 substitutes sum2+C2 (L) into the sum of variation coefficient sum2.

[Operation S87] The validity evaluation section 180 substitutes L+1 into the layer number L.

[Operation S88] The validity evaluation section 180 calculates the evaluation value H3 of the unauthorized sequence candidate corresponding to the normal candidate concerned as H3=exp (−sum2).

Thus, the validity evaluation section 180 acquires the evaluation value H3 based on the request issue time on each hierarchical layer. Here, for each restored transaction, it is assumed that the normality of the normal candidate used for restoration is high, so that the variation in the request issue time in each hierarchical layer is small. This is because it is common to accept a request against a routine business processing in the business system. There is no substantial difference among the processing times for the respective requests. For this reason, it is possible that the validity of the unauthorized sequence candidate used for generation of a normal candidate is also high, so that the value of evaluation value H3 is large.

In the above operations S84 to S87, the reason for not calculating the coefficient of variation in the case of L=3 is that the DB server 400 does not issue a request to any of the other servers.

In addition the transaction recovery illustrated in operations S61, S71, and S81 may be performed once by any of the methods when performing the validity evaluation using a combination of a plurality of methods.

Figure 21:
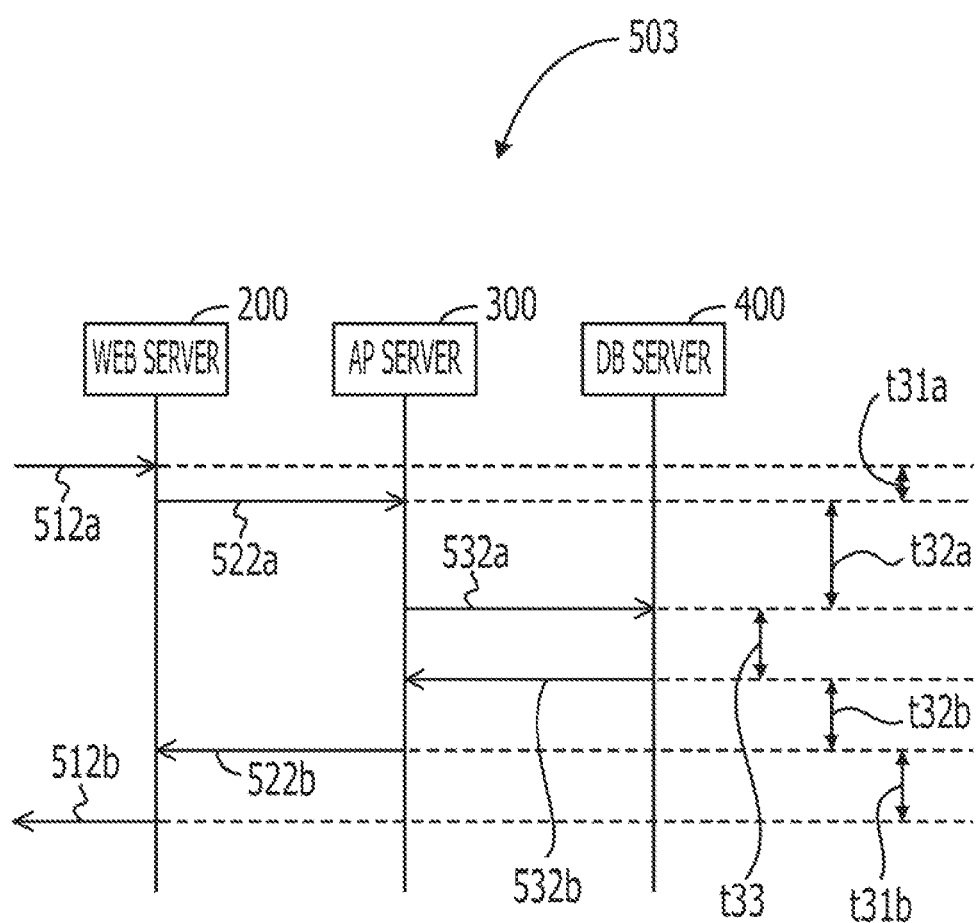
FIG. 21 is a diagram illustrating a request issuing time.

FIG. 21 is a diagram illustrating a process time and a request issuing time. In FIG. 21, the process time and the request issue time are illustrated with respect to the transaction 503. A time lag t31a is a period of time from receiving the HTTP request 512a to issuing the IIOP request 522a by the Web server 200. Thus, the time lag t31a is the request issue time of the Web server 200.

A time lag t31b is a period of time from receiving the IIOP response 522b to issuing the HTTP response 512b by the Web server 200. The total time of the time lags t31a and t31b is the processing time of the Web server 200.

A time lag t32a is a period of time from receiving the IIOP request 522a to issuing the DB request 532a by the AP server 300. The time lag t32a is the request issue time of the AP server 300.

A time lag t32b is a period of time from receiving the DB response 532b to issuing the IIOP response 522b by the AP server 300.

The total time of the time lags t32a and t32b is the processing time of the AP server 300.

A time lag t33 is a period of time from receiving the DB request 532a to issuing the DB response 532b by the DB server 400. The time lag t33 is the processing time of the DB server 400.

The validity evaluation section 180 obtains the coefficient of variation by calculating variance of the processing time or request issue time on each hierarchical layer with respect to each restored transaction.

Figure 22B:
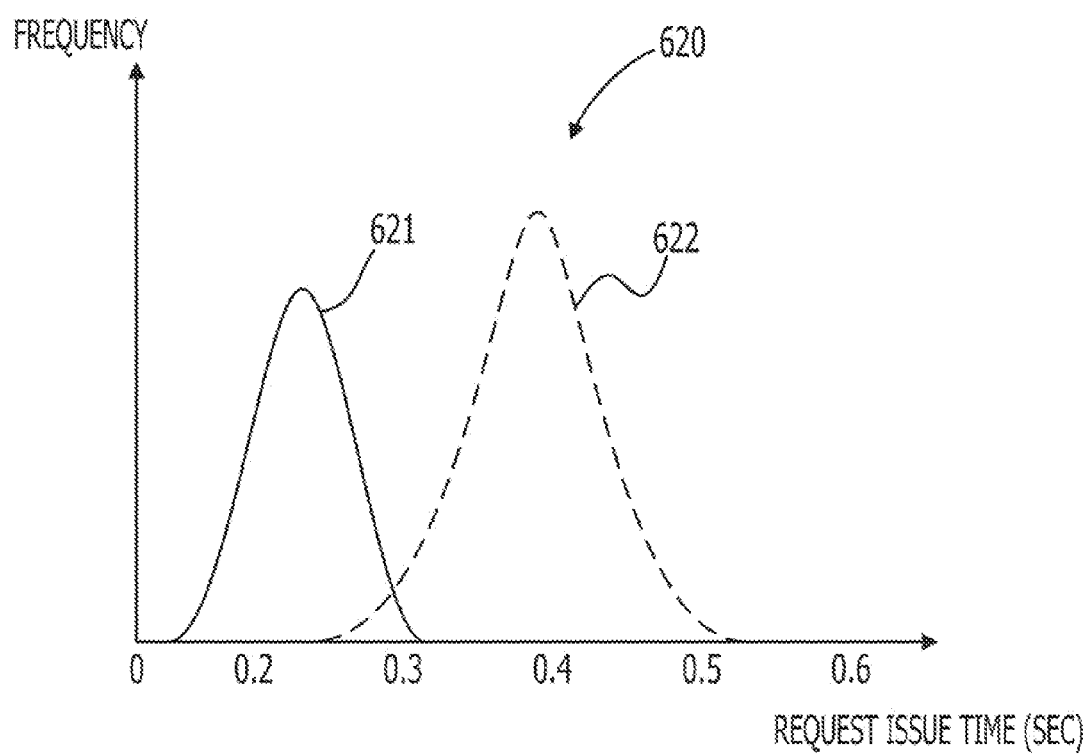

FIGS. 22A and 22B are diagrams each illustrating a specific example of the validity evaluation.

In FIG. 22A, a frequency distribution 610 is the distribution of processing times related to the respective transactions generated in a certain normal candidate. A distribution 611 is the distribution of processing times on the hierarchical layer (Web layer) belonging to the Web server 200. A distribution 612 is the distribution of processing times on the hierarchical layer (AP layer) belonging to the AP server 300. A distribution 613 is the distribution of processing times on the hierarchical layer (DB layer) belonging to the DB server 400.

The validity evaluation section 180 is able to obtain an evaluation value H2 by calculating the sum of variation coefficients sum1 based on each of the variances of distributions 611, 612, and 613.

In FIG. 22B, the frequency distribution 620 is the distribution of request issue times of each transaction generated in a certain normal candidate. The distribution 621 is the distribution of request issue times on the Web layer. The distribution 622 is the distribution of request issue times on the AP layer.

The validity evaluation section 180 is able to obtain an evaluation value H3 by calculating the sum of variation coefficients sum2 based on each of the variances of distributions 621 and 622.

The validity evaluation section 180 outputs evaluation values H1, H2, and H3 acquired as described above to the analysis-result output unit 190. The analysis-result output unit 190 ranks each of the unauthorized sequence candidates based on the evaluation values acquired from the validity evaluation section 180 and causes the monitor 11 to display the ranked unauthorized sequence candidates.

Next, the result output process represented in the operation S18 of FIG. 9 will be described.

Figure 23:
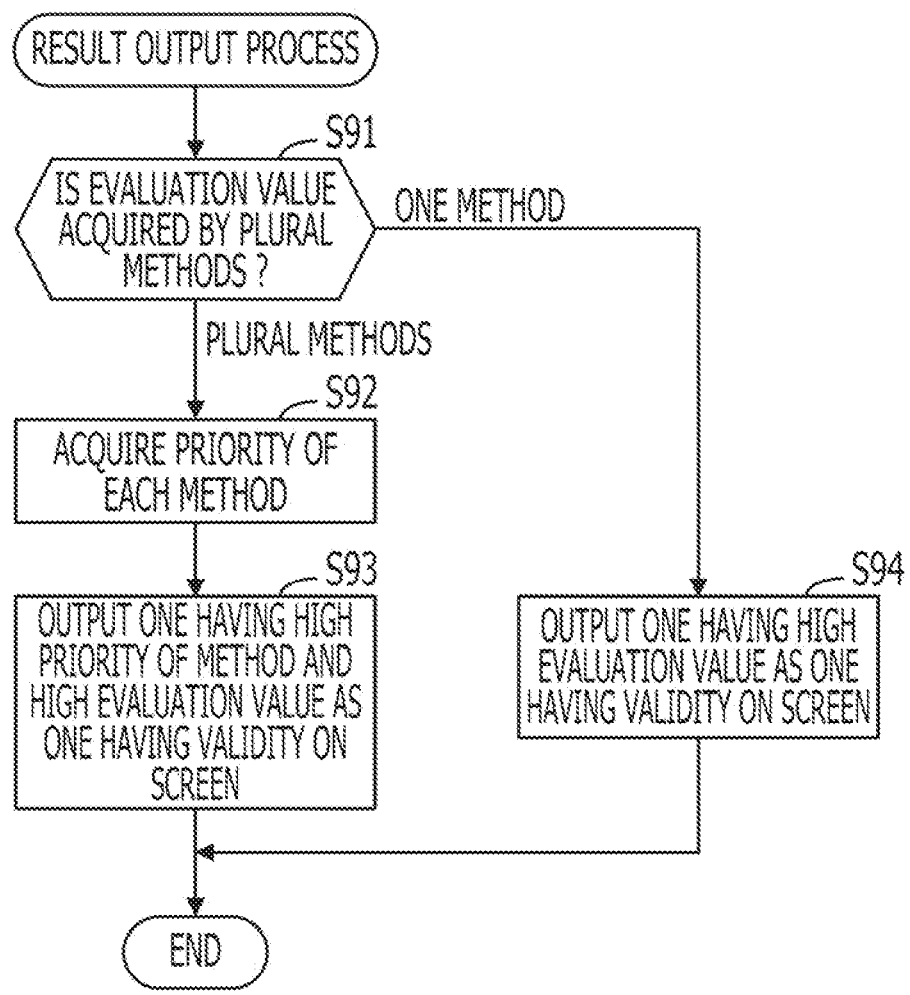
FIG. 23 is a flow chart illustrating a result output process.

FIG. 23 is a flow chart illustrating a result output process. Hereinafter, each operation of the process will be described along with operation numbers.

[Operation S91] The analysis-result output unit 190 determines whether any one or two or more of the evaluation value H1 based on the number of transactions, the evaluation value H2 based on the processing time on each hierarchical layer, and the evaluation value H3 based on the request issue time in each hierarchical layer is acquired. If evaluation values for a plurality of the methods are acquired, the process proceeds to operation S92. If an evaluation value for any one of the methods is acquired, the process proceeds to operation S94.

[Operation S92] The analysis-result output unit 190 acquires the priorities of the respective methods: the evaluation method based on the number of transactions, the evaluation method based on the processing time on each hierarchical layer, and the evaluation method based on the request issue time on each hierarchical layer. Here, the priority is previously determined by the unauthorized-access detecting apparatus 100. For example, the evaluation method based on the number of transactions is assigned the highest priority. The evaluation method based on the processing time is assigned the next highest priority. Subsequently, the evaluation method based on request issue time is assigned the next highest priority.

[Operation S93] The analysis-result output unit 190 ranks an unauthorized sequence candidate having a high priority of each method and a high evaluation value as a high rank. The higher the rank is, the higher the validity is. The analysis-result output unit 190 causes the monitor 11 to display the result of the rank. Consequently, the process is ended.

[Operation S94] The analysis-result output unit 190 ranks an unauthorized sequence candidate having a high evaluation value to a higher rank. The analysis-result output unit 190 causes the monitor 11 to display the result of the rank. Consequently, the process is ended.

Thus, the analysis-result output unit 190 ranks the unauthorized sequence candidates in decreasing order of validity. The analysis-result output unit 190 causes the monitor 11 to display the ranked unauthorized sequence candidates based on the evaluation values H1, H2, and H3 calculated by the validity evaluation section 180.

The analysis-result output unit 190 is ready for more precise rankings by ranking unauthorized sequence candidates based on evaluation values calculated by a plurality of the methods. For example, even if the number of restored transactions for a plurality of normal candidates is substantially the same, it is possible to determine the superiority or inferiority of each normal candidate by evaluating the variation of processing times or the variation of request issue times for each normal candidate.

Next, the specific example of a display screen on which the results of the analysis are represented generated by the analysis-result output unit 190 will be described.

Figure 24:
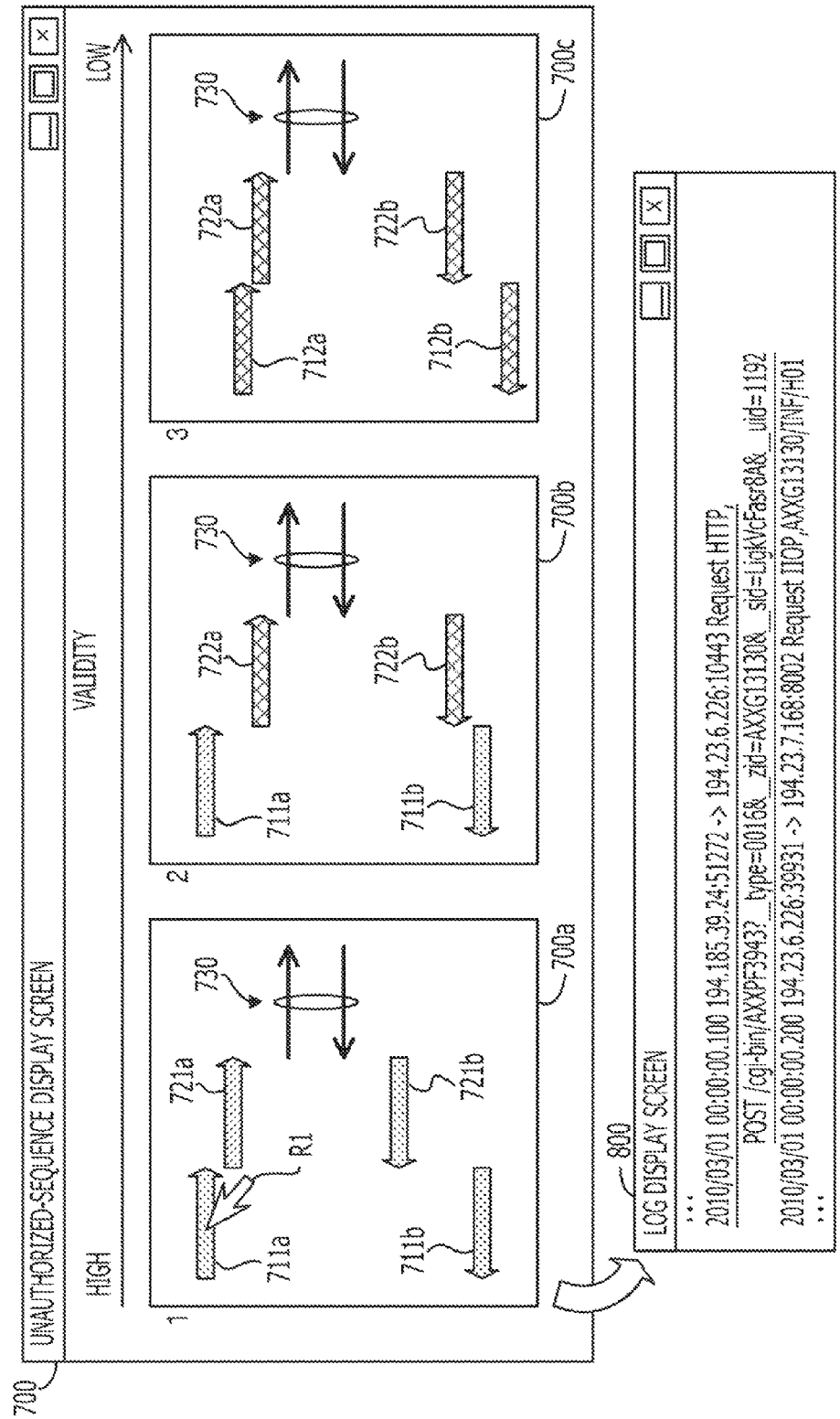
FIG. 24 is a diagram illustrating a first specific example of a display screen on which the results of the analysis are represented.

FIG. 24 is a diagram illustrating a first specific example of the display screen of an analysis result. The analysis-result output unit 190 causes the monitor 11 to display an unauthorized-sequence display screen 700. The unauthorized-sequence display screen 700 is a screen for displaying an unauthorized sequence candidate in decreasing order of validity. The analysis-result output unit 190 may cause the monitor 11 to display the unauthorized-sequence display screen 700, for example, when receiving a specified operation input with a keyboard 12 or mouse 13 used by the system manager.

The unauthorized-sequence display screen 700 includes unauthorized sequence candidate display sections 700a, 700b, and 700c.

The unauthorized sequence candidate display section 700a is an area where an unauthorized sequence candidate having the highest validity is displayed. In the example illustrated in FIG. 24, an image represented by the unauthorized sequence candidate 501 is displayed on the unauthorized sequence candidate display section 700a.

The unauthorized sequence candidate display section 700b is an area where an unauthorized sequence candidate having the second highest validity is displayed. In the example illustrated in FIG. 24, an image represented by the unauthorized sequence candidate 501a is displayed on the unauthorized sequence candidate display section 700b.

The unauthorized sequence candidate display section 700c is an area where an unauthorized sequence candidate having the third highest validity is displayed. In the example illustrated in FIG. 24, an image represented by the unauthorized sequence candidate 501b is displayed on the unauthorized sequence candidate display section 700c.

A plurality of four or more unauthorized sequence candidates may be displayed. Here, the unauthorized sequence candidate display sections 700a, 700b, and 700c display icons 711a, 711b, 712a, 712b, 721a, 721b, 722a, 722b, and 730, which represents messages in the unauthorized sequence candidates 501, 501a and 501b.

The icon 711a corresponds to the HTTP request 511a, and the icon 711b corresponds to the HTTP response 511b. The icon 712a corresponds to the HTTP request 512a, and the icon 712b corresponds to the HTTP response 512b. The icon 721a corresponds to the IIOP request 521a, and the icon 721b corresponds to the IIOP response 521b. The icon 722a corresponds to the IIOP request 522a, and the icon 722b corresponds to the IIOP response 522b. The icon 730 corresponds to a set of messages where unauthorized access is detected, or the DB request 531a and the DB response 531b.

The system manager is able to operate a pointer R1 to select each icon. Upon selecting, the analysis-result output unit 190 causes the monitor 11 to display a log display screen 800 corresponding to the icon with reference to the restoration message 121 stored in the protocol-log storage unit 120.

For example, the analysis-result output unit 190 may accept a selection operation on the icon 711a by the pointer R1. In this case, the icon 711a corresponds to the HTTP request. Therefore, the analysis-result output unit 190 causes the monitor 11 to display the log display screen 800 including the contents of the relevant message among the restoration messages 121. Specifically, the relevant message among the restoration messages 121 corresponds to the contents of the first line of the restoration message 121 illustrated in FIG. 7.

The system manager can acquire the information on the message about the unauthorized access by referring to the log display screen 800. A system manager can easily identify a sequence candidate having a higher degree of probability among sequence candidates related to unauthorized access. From the exemplary log display screen 800, the user ID in the HTTP request 511a may be easily identified. The system manager is able to suitably deal with the unauthorized access.

Figure 25:
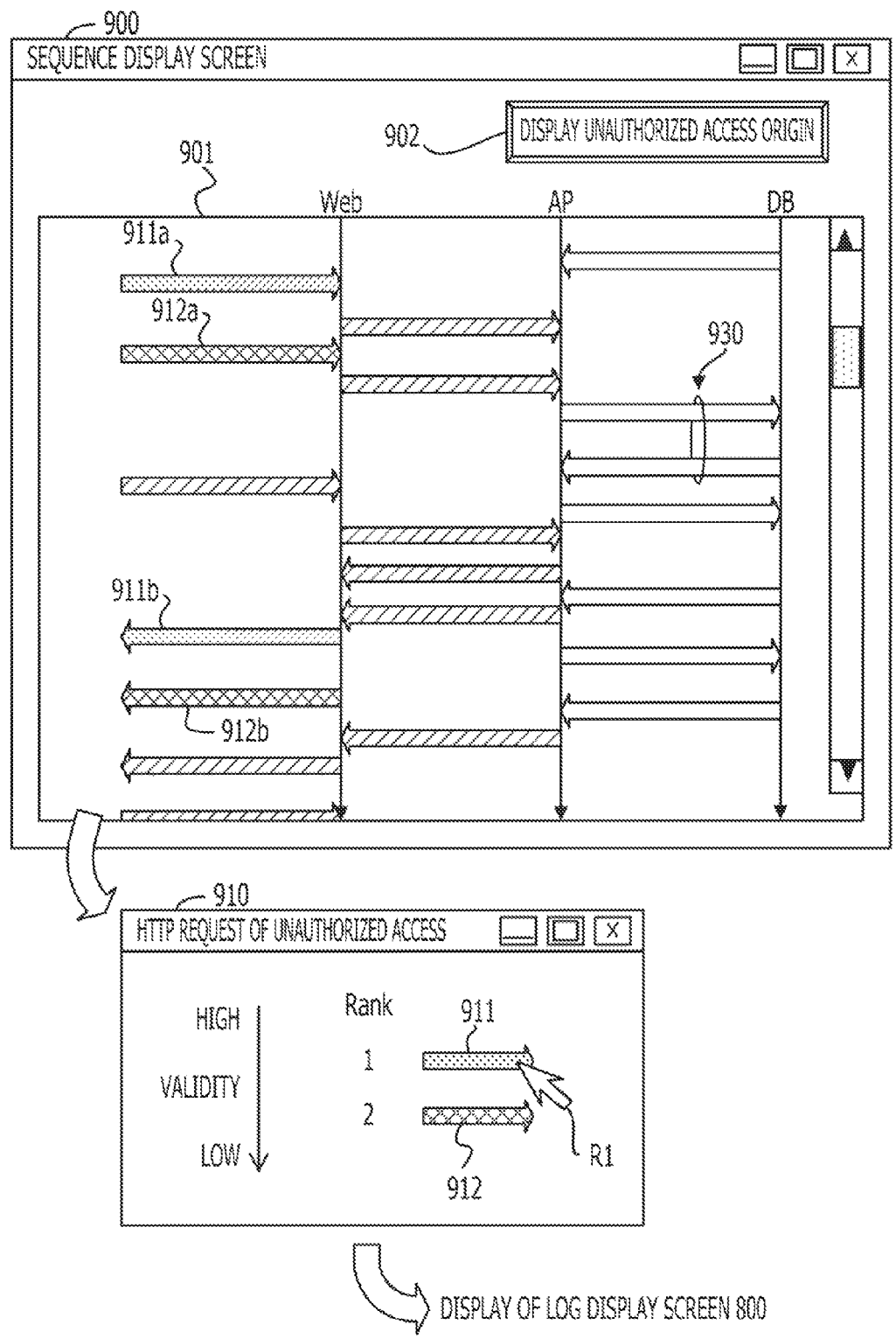
FIG. 25 is a diagram illustrating a first specific example of a display screen on which the results of the analysis are represented.

FIG. 25 is a diagram illustrating a second specific example of a display screen on which the results of the analysis are represented. The analysis-result output unit 190 causes the monitor 11 to display a sequence display screen 900. The sequence display screen 900 is a screen that displays the list of the messages transmitted and received by the respective servers. The analysis-result output unit 190 causes the monitor 11 to display the sequence display screen 900 with reference to the protocol-log management table 122 in the protocol-log storage unit 120. The analysis-result output unit 190 may cause the monitor 11 to display the sequence display screen 900, for example, when receiving a specified operation input with the keyboard 12 or mouse 13 used by the system manager.

The sequence display screen 900 includes a sequence display section 901 and a button 902 for displaying an unauthorized access origin.

The sequence display section 901 is an area where the list of messages transmitted and received by the respective servers is displayed in chronological order. The sequence display section 901 displays icons representing the respective messages in chronological order while causing them to be visually distinguished from one another. The icons may be distinguished from one another by, for example, colors or patterns. Alternatively, a character string, which represents part of the contents of each message, may be additionally written on each icon in a distinguishable manner. Icons 911a, 911b, 912a, 912b, and 930 are examples of such icons.

The icon 911a corresponds to the HTTP request 511a, and the icon 911b corresponds to the HTTP response 511b. The icon 912a corresponds to the HTTP request 512a, and the icon 912b corresponds to the HTTP response 512b. The icon 930 corresponds to a pair of messages where unauthorized access is detected, or the DB request 531a and the DB response 531b.

In the case that some of the messages dated in all of the time zones are not clearly displayed in the sequence display section 901, the analysis-result output unit 190 is able to scroll back and forth between the time zones to be displayed in response to an input to operate a scroll bar on the sequence display section 901.

The button 902 for displaying the unauthorized access origin display is a button for receiving an instruction for displaying the HTTP request display screen 910. The system manager is able to input the instruction for displaying the HTTP request display screen 910 to the analysis-result output unit 190 by pressing the button 902 via the pointer R1.

Upon pressing the button 902 for displaying the unauthorized access origin, the analysis-result output unit 190 causes the monitor 11 to display the HTTP request display screen 910.

The HTTP request display screen 910 is a screen displaying a list of the HTTP requests of unauthorized sequence candidates having high validity (high ranking) among the messages displayed on the sequence display section 901. The icons 911 and 912 are displayed on the exemplary HTTP request display screen 910. The icon 911 is displayed as a HHTP request having a validity higher than that of the icon 912.

The icon 911 corresponds to an icon 911a. That is, the icon 911 corresponds to the HTTP request 511a of the unauthorized sequence candidate 501. The icon 911 is displayed so as to be visually identified by substantially the same appearance as that of the icon 911a. More specifically, the icon 911 has substantially the same color and pattern as the icon 911a. Alternatively, the substantially same character string as that of the icon 911a is additionally written on the icon 911.

The icon 912 corresponds to an icon 912a. That is, the icon 912 corresponds to the HTTP request 512a of the unauthorized sequence candidate 501a. The icon 912 is designed so as to be displayed on the sequence display section 901 while being visually identified by the same appearance as that of the icon 912a. The specific appearance of the icon 912 follows the above description of the icon 911.

The system manager is able to operate a pointer R1 to select the icons 911 and 912. Upon selecting, the analysis-result output unit 190 causes the monitor 11 to display a log display screen 800 corresponding to the icon with reference to the restoration message 121 stored in the protocol-log storage unit 120.

A method for displaying the log display screen 800 is substantially the same as one illustrated in FIG. 24. For example, the analysis-result output unit 190 may accept a selection operation on the icon 911 by the pointer R1. In this case, the icon 911 corresponds to the HTTP request 511a. Therefore, the analysis-result output unit 190 causes the monitor 11 to display the log display screen 800 including the contents of the relevant message among the restoration messages 121.

Thus, even if the sequence display screen 900 and the HTTP request display screen 910 are used, the analysis-result output unit 190 is able to accept display and operation which are equivalent to those of the unauthorized-sequence display screen 700. Thus, the substantially same effects are obtainable.

The unauthorized access detecting apparatus 100 may obtain the user ID, which is included in the unauthorized sequence candidate having high validity, from the analysis-result output unit 190 and then notify the system manager of the user ID. For example, the unauthorized access detecting apparatus 100 may notify the system manager of the user ID via e-mail. In addition, for example, a message dialog may be displayed on another information processing apparatus operated by the system manager through the network. This causes the system manager to be reliably notified of the generation of an unauthorized access and the access origin candidate thereof even if the system manager cannot operate the unauthorized access detecting apparatus 100 in a direct manner.

The unauthorized-access detecting apparatus 100 may acquire the user ID in the unauthorized sequence candidate having high validity from the analysis-result output unit 190, and may cause the Web server 200 to refuse subsequent access by the relevant user ID. In addition, the unauthorized access detecting apparatus 100 may cause the switch device 10 to shutdown the subsequent communication including the relevant user ID. Alternatively, the unauthorized access detecting apparatus 100 may filter and shutdown the subsequent communication including the user ID. This causes the user to reduce or prevent the subsequent fraud by the relevant user from occurring.

Here, in the hierarchical system, applications, which are independently designed, are installed on the respective hierarchical servers. For this reason, in the prior art, it has been difficult to find out the relevance of the messages transmitted and received among the respective hierarchical layers to the unauthorized access.

On the other hand, the unauthorized access detecting apparatus 100 uses the messages of the normal candidates except for each unauthorized sequence candidate to evaluate a plurality of unauthorized sequence candidates which may be related to an unauthorized access. Therefore, the degree of probability of each unauthorized sequence candidate will be properly evaluated. As a result, the unauthorized access detecting apparatus 100 is able to present a plurality of unauthorized sequence candidates related to an unauthorized access, which is detected on the specified hierarchical layer in the hierarchical system, in decreasing order of validity.

The system manager can easily identify a communication candidate having a higher degree of probability among communication sequence candidates related to unauthorized access.

Therefore, the unauthorized access detecting apparatus 100 is able to support the identification of a communication sequence for unauthorized access in the hierarchical system efficiently.

As described above, the analysis program, analyzing apparatus, and analytic method of the present invention have been described with reference to the embodiments illustrated in the drawings. However, they are not limited to those described above. Alternatively, the configuration of each member may be replaced with any one having an equivalent function. Alternatively, other structures or operations may be added. Furthermore, two or more configurations (features) among those of the aforementioned embodiments may be combined.

All examples and conditional language recited herein are intended for pedagogical objects to aid the reader in understanding the invention and the concepts contributed by the inventor to furthering the art, and are to be construed as being without limitation to such specifically recited examples and conditions. Although the embodiment(s) of the present inventions have been described in detail, it should be understood that the various changes, substitutions, and alterations could be made hereto without departing from the spirit and scope of the invention.

What is claimed is:

1. A computer-readable, non-transitory medium storing an analysis program that causes a computer to execute a procedure, the procedure comprising:

extracting a plurality of sequence candidates for communications related to unauthorized access performed between a plurality of information processing apparatuses on a basis of communication histories stored in a storage unit storing the communication histories between the plurality of information processing apparatuses;

calculating and outputting an evaluation value representing a degree of probability that the respective plurality of sequence candidates are unauthorized accesses on a basis of normality of a transaction which is restorable by a second communication history excluding a first communication history corresponding to each of the plurality of sequence candidates, among the communication histories stored in the storage unit; and determining a time width to bring a request, which is received by each information processing apparatus for a plurality of communications dated in a specified time width encompassing a generation time of the unauthorized access among the communication histories stored in the storage unit, and a response, which is transmitted by the information processing apparatus in response to the request, into correspondence with each other, wherein the plurality of sequence candidates is extracted within the time width among the communication histories stored in the storage unit, and the evaluation value of each of the sequence candidates is calculated.

2. The computer-readable, non-transitory medium according to claim 1, wherein a first evaluation value is calculated as the evaluation value based on the number of the transactions restored by the second communication history.

3. The computer-readable, non-transitory medium according to claim 1, wherein a second evaluation value is calculated as the evaluation value for each transaction restored by the second communication history on a basis of a time taken to perform specified processing by the same information processing apparatus.

4. The computer-readable, non-transitory medium according to claim 3, wherein the time taken to perform the specified processing is a request issue time from receiving a first request by the information processing apparatus to transmitting a second request to another information apparatus by the information processing apparatus.

5. The computer-readable, non-transitory medium according to claim 3, wherein the time taken to perform the specified processing is a total time of: a request issue time from receiving a first request by the information processing apparatus to transmitting a second request to another information apparatus by the information processing apparatus; and a response issue time from receiving the first response to the second request from the another information processing apparatus to transmitting a second response to the first request.

6. The computer-readable, non-transitory medium according to claim 3, wherein the second evaluation value is calculated based on a sum of variation coefficients obtained by summing a variation coefficient of the time taken to perform the specified processing by each information processing apparatus and the transaction.

7. The computer-readable, non-transitory medium according to claim 6, wherein the second evaluation value is calculated by calculation of exp (−x) with respect to a sum of variation coefficient x (where x is an integer of zero or more).

8. The computer-readable, non-transitory medium according to claim 2, wherein images that represent the sequence candidates corresponding to the evaluation values are displayed on a display section by bringing the sequence candidates into correspondence with the evaluation value having the highest degree of probability to the evaluation value having the lowest degree of probability in descending order of each of the evaluation values.

9. An analyzing apparatus comprising:
circuitry configured to:
extract a plurality of sequence candidates for communications related to unauthorized access performed between a plurality of information processing apparatuses on a basis of communication histories stored in a storage unit storing the communication histories between the plurality of information processing apparatuses;
calculate and output an evaluation value representing the degree of probability that the respective plurality of sequence candidates are unauthorized accesses on a basis of normality of a transaction which is restorable by a second communication history excluding a first communication history corresponding to each of the plurality of sequence candidates, among the communication histories stored in the storage unit; and
determine a time width to bring a request, which is received by each information processing apparatus for a plurality of communications dated in a specified time width encompassing a generation time of the unauthorized access among the communication histories stored in the storage unit, and a response, which is transmitted by the information processing apparatus in response to the request, into correspondence with each other,
wherein the plurality of sequence candidates is extracted within the time width among the communication histories stored in the storage unit, and the evaluation value of each of the sequence candidates is calculated.

10. An analyzing apparatus comprising:
a processor configured to execute a procedure, the procedure comprising:
extracting a plurality of sequence candidates for communications related to unauthorized access performed between a plurality of information processing apparatuses on a basis of communication histories stored in a storage unit storing the communication histories between the plurality of information processing apparatuses;
calculating and outputting an evaluation value representing a degree of probability that the respective plurality of sequence candidates are unauthorized accesses on a basis of normality of a transaction which is restorable by a second communication history excluding a first communication history corresponding to each of the plurality of sequence candidates, among the communication histories stored in the storage unit; and
determining a time width to bring a request, which is received by each information processing apparatus for a plurality of communications dated in a specified time width encompassing a generation time of the unauthorized access among the communication histories stored in the storage unit, and a response, which is transmitted by the information processing apparatus in response to the request, into correspondence with each other,
wherein the plurality of sequence candidates is extracted within the time width among the communication histories stored in the storage unit, and the evaluation value of each of the sequence candidates is calculated.

11. An analytic method executed by an analyzing apparatus, the method comprising:
extracting a plurality of sequence candidates for communications related to unauthorized access performed between a plurality of information processing apparatuses on a basis of communication histories stored in a storage unit storing the communication histories between the plurality of information processing apparatuses;
calculating and outputting an evaluation value representing a degree of probability that the respective plurality of sequence candidates are unauthorized accesses on a basis of normality of a transaction which is restorable by a second communication history excluding a first communication history corresponding to each of the plurality of sequence candidates, among the communication histories stored in the storage unit; and
determining a time width to bring a request, which is received by each information processing apparatus for a plurality of communications dated in a specified time width encompassing a generation time of the unauthorized access among the communication histories stored in the storage unit, and a response, which is transmitted by the information processing apparatus in response to the request, into correspondence with each other,
wherein the plurality of sequence candidates is extracted within the time width among the communication histories stored in the storage unit, and the evaluation value of each of the sequence candidates is calculated.

* * * * *

UNITED STATES PATENT AND TRADEMARK OFFICE
CERTIFICATE OF CORRECTION

PATENT NO. : 8,892,510 B2  
APPLICATION NO. : 13/114255  
DATED : November 18, 2014  
INVENTOR(S) : Motoyuki Kawaba Page 1 of 1

It is certified that error appears in the above-identified patent and that said Letters Patent is hereby corrected as shown below:

On the Title Page, insert the following:

item --(30) Foreign Application Priority Data: June 2, 2010 (JP)............2010-126787.--.

Signed and Sealed this
Thirty-first Day of March, 2015

Michelle K. Lee
*Director of the United States Patent and Trademark Office*